United States Patent
Beyhs

(10) Patent No.: US 11,906,937 B2
(45) Date of Patent: *Feb. 20, 2024

(54) CROWN FOR AN ELECTRONIC WATCH

(71) Applicant: Apple Inc., Cupertino, CA (US)

(72) Inventor: Michael J. Beyhs, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/094,930

(22) Filed: Jan. 9, 2023

(65) Prior Publication Data

US 2023/0161299 A1 May 25, 2023

Related U.S. Application Data

(63) Continuation of application No. 16/191,349, filed on Nov. 14, 2018, now Pat. No. 11,561,515.

(60) Provisional application No. 62/713,745, filed on Aug. 2, 2018.

(51) Int. Cl.
*G04G 21/08* (2010.01)
*G04G 9/00* (2006.01)
*G06F 3/042* (2006.01)

(52) U.S. Cl.
CPC ............ *G04G 21/08* (2013.01); *G04G 9/007* (2013.01); *G06F 3/0425* (2013.01)

(58) Field of Classification Search
CPC ........ G01D 5/30; G04G 17/08; G04G 21/025; G04G 21/08; G04G 9/007; G04B 37/10; G04B 27/002; H01H 3/122; H01H 9/16; H01H 25/008; H01H 2215/006; H01H 2221/01; H01H 25/06; H01H 2209/006; H01H 2223/002; G04C 3/002; G06F 3/0425
See application file for complete search history.

(56) References Cited

U.S. PATENT DOCUMENTS 2,237,860 A   4/1941   Bolle
2,288,215 A   6/1942   Taubert et al.
2,497,935 A   2/1950   Feurer
(Continued)

FOREIGN PATENT DOCUMENTS

CH   1888928   1/1937
CN   1302740   9/2001
(Continued)

OTHER PUBLICATIONS

Author Unknown, "Desirable Android Wear smartwatch from LG," Gulf News, Dubai, 3 pages, Jan. 30, 2015.
(Continued)

*Primary Examiner* — Edwin A. Leon
(74) *Attorney, Agent, or Firm* — Brownstein Hyatt Farber Schreck LLP

(57) ABSTRACT

An electronic watch includes a housing defining a side surface of the electronic watch, a transparent cover coupled to the housing and defining a front surface of the electronic watch, an image-sensing element, and a crown extending from the side of the housing and defining an imaging surface. The crown may include a light-directing feature configured to direct, onto the image-sensing element, an image of an object in contact with the imaging surface.

20 Claims, 13 Drawing Sheets

(56) References Cited

U.S. PATENT DOCUMENTS

| | | |
|---|---|---|
| 2,771,734 A | 11/1956 | Morf |
| 2,788,236 A | 4/1957 | Kafowi |
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,362,154 A | 1/1968 | Perret |
| 3,410,247 A | 11/1968 | Dronberger |
| 3,495,398 A | 2/1970 | Widmer et al. |
| 3,577,876 A | 5/1971 | Spadini |
| 3,621,649 A | 11/1971 | Vulcan et al. |
| 3,662,618 A | 5/1972 | Kroll et al. |
| 3,733,803 A | 5/1973 | Hiraga |
| 3,937,002 A | 2/1976 | Van Haften |
| 4,007,347 A | 2/1977 | Haber |
| 4,031,341 A | 6/1977 | Wuthrich et al. |
| 4,037,068 A | 7/1977 | Gaynor |
| 4,051,665 A | 10/1977 | Arn |
| 4,077,200 A | 3/1978 | Schneider |
| 4,133,404 A | 1/1979 | Griffin |
| 4,170,104 A | 10/1979 | Yamagata |
| 4,258,096 A | 3/1981 | LaMarche |
| 4,274,152 A | 6/1981 | Ikegami |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,396,298 A | 8/1983 | Ripley |
| 4,417,824 A | 11/1983 | Paterson et al. |
| 4,448,199 A | 5/1984 | Schmid |
| 4,520,306 A | 5/1985 | Kirby |
| 4,581,509 A | 4/1986 | Sanford et al. |
| 4,600,316 A | 7/1986 | Besson |
| 4,617,461 A | 10/1986 | Subbarao et al. |
| 4,634,861 A | 1/1987 | Ching et al. |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A | 4/1990 | Kanezashi et al. |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,177,355 A | 1/1993 | Branan |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,477,508 A | 12/1995 | Will |
| 5,509,174 A | 4/1996 | Worrell |
| 5,559,761 A | 9/1996 | Frenkel et al. |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,738,104 A | 4/1998 | Lo |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,960,366 A | 9/1999 | Duwaer et al. |
| 5,963,332 A | 10/1999 | Feldman et al. |
| 5,999,168 A | 12/1999 | Rosenberg et al. |
| 6,069,567 A | 5/2000 | Zawilski |
| 6,128,006 A | 10/2000 | Rosenberg et al. |
| 6,134,189 A | 10/2000 | Carrard |
| 6,154,201 A | 11/2000 | Levin et al. |
| 6,175,679 B1 | 1/2001 | Veligdan et al. |
| 6,203,190 B1 | 3/2001 | Stotz |
| 6,241,684 B1 | 6/2001 | Amano |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,361,502 B1 | 3/2002 | Puolakanaho et al. |
| 6,377,239 B1 | 4/2002 | Isikawa |
| 6,392,640 B1 | 5/2002 | Will |
| 6,396,006 B1 | 5/2002 | Yokoji et al. |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1 | 7/2003 | Line |
| 6,636,197 B1 | 10/2003 | Goldenberg et al. |
| 6,646,635 B2 | 11/2003 | Pogatetz et al. |
| 6,661,438 B1 | 11/2003 | Shiraishi et al. |
| 6,672,758 B2 | 1/2004 | Ehrsam et al. |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2 | 1/2005 | Hasumi et al. |
| 6,882,596 B2 | 4/2005 | Guanter |
| 6,888,076 B2 | 5/2005 | Hetherington |
| 6,896,403 B1 | 5/2005 | Gau |
| 6,909,378 B1 | 6/2005 | Lambrechts et al. |
| 6,914,551 B2 | 7/2005 | Vidal |
| 6,950,695 B2 | 9/2005 | Chen |
| 6,961,099 B2 | 11/2005 | Takano et al. |
| 6,963,039 B1 | 11/2005 | Weng et al. |
| 6,967,903 B2 | 11/2005 | Guanter |
| 6,977,868 B2 | 12/2005 | Brewer et al. |
| 6,982,930 B1 | 1/2006 | Hung |
| 6,985,107 B2 | 1/2006 | Anson |
| 6,987,568 B2 | 1/2006 | Dana |
| 6,998,553 B2 | 2/2006 | Hisamune et al. |
| 7,009,915 B2 | 3/2006 | Brewer et al. |
| 7,016,263 B2 | 3/2006 | Gueissaz et al. |
| 7,021,442 B2 | 4/2006 | Borgerson |
| 7,031,228 B2 | 4/2006 | Born et al. |
| 7,034,237 B2 | 4/2006 | Ferri et al. |
| 7,081,905 B1 | 7/2006 | Raghunath et al. |
| 7,102,626 B2 | 9/2006 | Denny, III |
| 7,111,365 B1 | 9/2006 | Howie, Jr. |
| 7,113,450 B2 | 9/2006 | Plancon et al. |
| 7,119,289 B2 | 10/2006 | Lacroix |
| 7,135,673 B2 | 11/2006 | Saint Clair |
| 7,167,083 B2 | 1/2007 | Giles |
| 7,187,359 B2 | 3/2007 | Numata |
| 7,244,927 B2 | 7/2007 | Huynh |
| 7,255,473 B2 | 8/2007 | Hiranuma et al. |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,286,063 B2 | 10/2007 | Gauthey |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,385,874 B2 | 6/2008 | Vuilleumier |
| 7,404,667 B2 | 7/2008 | Born et al. |
| 7,465,917 B2 | 12/2008 | Chin et al. |
| 7,468,036 B1 | 12/2008 | Rulkov et al. |
| 7,506,269 B2 | 3/2009 | Lang et al. |
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |

(56) References Cited

U.S. PATENT DOCUMENTS

| | | |
|---|---|---|
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,655,874 B2 | 2/2010 | Akieda |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,587 B2 | 9/2010 | Kosugi |
| 7,791,588 B2 | 9/2010 | Tierling et al. |
| 7,791,597 B2 | 9/2010 | Silverstein et al. |
| 7,822,469 B2 | 10/2010 | Lo |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 7,894,957 B2 | 2/2011 | Carlson |
| 7,946,758 B2 | 5/2011 | Mooring |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,275,327 B2 | 9/2012 | Yi et al. |
| 8,294,670 B2 | 10/2012 | Griffin et al. |
| 8,312,495 B2 | 11/2012 | Vanderhoff |
| 8,318,340 B2 | 11/2012 | Stimits |
| 8,368,677 B2 | 2/2013 | Yamamoto |
| 8,371,745 B2 | 2/2013 | Manni |
| 8,373,661 B2 | 2/2013 | Lan et al. |
| 8,405,618 B2 | 3/2013 | Colgate |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,666,682 B2 | 3/2014 | LaVigne et al. |
| 8,677,285 B2 | 3/2014 | Tsern et al. |
| 8,704,787 B2 | 4/2014 | Yamamoto |
| 8,711,093 B2 | 4/2014 | Ong et al. |
| 8,717,151 B2 | 5/2014 | Forutanpour et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,783,944 B2 | 7/2014 | Doi |
| 8,797,153 B2 | 8/2014 | Vanhelle et al. |
| 8,804,993 B2 | 8/2014 | Shukla et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,851,372 B2 | 10/2014 | Zhou |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,908,477 B2 | 12/2014 | Peters |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,948,832 B2 | 2/2015 | Hong et al. |
| 8,954,135 B2 | 2/2015 | Yuen et al. |
| 8,975,543 B2 | 3/2015 | Hakemeyer |
| 8,994,827 B2 | 3/2015 | Mistry et al. |
| 9,001,625 B2 | 4/2015 | Essery et al. |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,039,614 B2 | 5/2015 | Yuen et al. |
| 9,041,663 B2 | 5/2015 | Westerman |
| 9,042,971 B2 | 5/2015 | Brumback et al. |
| 9,049,998 B2 | 6/2015 | Brumback et al. |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,091,309 B2 | 7/2015 | Battlogg |
| 9,100,493 B1 | 8/2015 | Zhou |
| 9,101,184 B2 | 8/2015 | Wilson |
| 9,105,413 B2 | 8/2015 | Hiranuma et al. |
| 9,123,483 B2 | 9/2015 | Ferri et al. |
| 9,134,807 B2 | 9/2015 | Shaw et al. |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,350,850 B2 | 5/2016 | Pope et al. |
| 9,367,146 B2 | 6/2016 | Piot |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,501,044 B2 | 11/2016 | Jackson et al. |
| 9,520,100 B2 | 12/2016 | Houjou et al. |
| 9,532,723 B2 | 1/2017 | Kim |
| 9,542,016 B2 | 1/2017 | Armstrong-Muntner |
| 9,545,541 B2 | 1/2017 | Aragones et al. |
| 9,552,023 B2 | 1/2017 | Joo et al. |
| 9,599,964 B2 | 3/2017 | Gracia |
| 9,600,071 B2 | 3/2017 | Rothkopf |
| 9,607,505 B2 | 3/2017 | Rothkopf et al. |
| 9,620,312 B2 | 4/2017 | Ely et al. |
| 9,627,163 B2 | 4/2017 | Ely |
| 9,632,318 B2 | 4/2017 | Goto et al. |
| 9,632,537 B2 | 4/2017 | Memering |
| 9,638,587 B2 | 5/2017 | Marquas et al. |
| 9,651,922 B2 | 5/2017 | Hysek et al. |
| 9,659,482 B2 | 5/2017 | Yang et al. |
| 9,680,831 B2 | 6/2017 | Jooste et al. |
| 9,709,956 B1 | 7/2017 | Ely et al. |
| 9,753,436 B2 | 9/2017 | Ely et al. |
| D800,172 S | 10/2017 | Akana |
| 9,800,717 B2 | 10/2017 | Ma et al. |
| 9,836,025 B2 | 12/2017 | Ely et al. |
| 9,873,711 B2 | 1/2018 | Hoover et al. |
| 9,874,945 B2 | 1/2018 | Fukumoto |
| 9,886,006 B2 | 2/2018 | Ely et al. |
| 9,891,590 B2 | 2/2018 | Shim et al. |
| 9,891,651 B2 | 2/2018 | Jackson et al. |
| 9,891,667 B2 | 2/2018 | Jung et al. |
| 9,898,032 B2 | 2/2018 | Hafez et al. |

(56) References Cited

U.S. PATENT DOCUMENTS

| | | |
|---|---|---|
| 9,913,591 B2 | 3/2018 | Lapetina et al. |
| 9,921,548 B2 | 3/2018 | Mitani |
| 9,927,902 B2 | 3/2018 | Burr et al. |
| 9,939,923 B2 | 4/2018 | Sharma |
| 9,946,297 B2 | 4/2018 | Nazzaro et al. |
| 9,952,558 B2 | 4/2018 | Ely |
| 9,952,682 B2 | 4/2018 | Zhang et al. |
| 9,971,305 B2 | 5/2018 | Ely et al. |
| 9,971,405 B2 | 5/2018 | Holenarsipur et al. |
| 9,971,407 B2 | 5/2018 | Holenarsipur et al. |
| 9,979,426 B2 | 5/2018 | Na et al. |
| 10,001,817 B2 | 6/2018 | Zambetti et al. |
| 10,012,550 B2 | 7/2018 | Yang |
| 10,018,966 B2 | 7/2018 | Ely et al. |
| 10,019,097 B2 | 7/2018 | Ely et al. |
| 10,037,006 B2 | 7/2018 | Ely |
| 10,037,081 B2 | 7/2018 | Grant |
| 10,048,802 B2 | 8/2018 | Shedletsky |
| 10,057,470 B2 | 8/2018 | Sangeun |
| 10,061,399 B2 | 8/2018 | Bushnell et al. |
| 10,066,970 B2 | 9/2018 | Gowreesunker et al. |
| 10,092,203 B2 | 10/2018 | Mirov |
| 10,108,016 B2 | 10/2018 | Bosveld |
| 10,114,342 B2 | 10/2018 | Kim et al. |
| 10,145,711 B2 | 12/2018 | Boonsom et al. |
| 10,175,652 B2 | 1/2019 | Ely et al. |
| 10,190,891 B1 | 1/2019 | Rothkopf et al. |
| 10,203,662 B1 | 2/2019 | Lin et al. |
| 10,209,148 B2 | 2/2019 | Lyon et al. |
| 10,216,147 B2 | 2/2019 | Ely et al. |
| 10,222,755 B2 | 3/2019 | Coakley et al. |
| 10,222,756 B2 | 3/2019 | Ely et al. |
| 10,222,909 B2 | 3/2019 | Shedletsky et al. |
| 10,234,828 B2 | 3/2019 | Ely et al. |
| 10,241,593 B2 | 3/2019 | Chen |
| 10,274,905 B2 * | 4/2019 | Chung ................. G04B 19/223 |
| 10,296,125 B2 | 5/2019 | Ely et al. |
| 10,331,081 B2 | 6/2019 | Ely et al. |
| 10,331,082 B2 | 6/2019 | Ely et al. |
| 10,332,111 B2 | 6/2019 | Mokhasi et al. |
| 10,353,487 B2 | 7/2019 | Chung et al. |
| 10,379,629 B2 | 8/2019 | Bushnell et al. |
| 10,386,940 B2 | 8/2019 | Kim |
| 10,401,961 B2 | 9/2019 | Cruz-Hernandez et al. |
| 10,429,959 B2 | 10/2019 | Battlogg |
| 10,474,194 B1 | 11/2019 | Ell et al. |
| 10,503,258 B2 | 12/2019 | Holenarsipur et al. |
| 10,509,486 B2 | 12/2019 | Bushnell et al. |
| 10,524,671 B2 | 1/2020 | Lamego |
| 10,534,320 B2 | 1/2020 | Ferri et al. |
| 10,534,900 B2 | 1/2020 | Cheong et al. |
| 10,551,798 B1 | 2/2020 | Bushnell et al. |
| 10,572,053 B2 | 2/2020 | Ely et al. |
| 10,579,090 B2 | 3/2020 | Jackson et al. |
| 10,593,617 B2 | 3/2020 | Ashikaga et al. |
| 10,599,101 B2 | 3/2020 | Rothkopf et al. |
| 10,610,157 B2 | 4/2020 | Pandya et al. |
| 10,613,685 B2 | 4/2020 | Shedletsky |
| 10,627,783 B2 | 4/2020 | Rothkopf et al. |
| 10,655,988 B2 | 5/2020 | Boonsom et al. |
| 10,664,074 B2 | 5/2020 | Moussette et al. |
| 10,732,571 B2 | 8/2020 | Ely et al. |
| 10,765,019 B2 | 9/2020 | Werner |
| 10,845,764 B2 | 11/2020 | Ely et al. |
| 10,852,700 B2 | 12/2020 | Abramov |
| 10,852,855 B2 | 12/2020 | Niu |
| 10,871,385 B2 | 12/2020 | Kok |
| 10,884,549 B2 | 1/2021 | Shedletsky et al. |
| 10,936,071 B2 | 3/2021 | Pandya et al. |
| 10,942,491 B2 | 3/2021 | Rothkopf |
| 10,948,880 B2 | 3/2021 | Ely et al. |
| 10,955,937 B2 | 3/2021 | Bushnell et al. |
| 10,962,930 B2 | 3/2021 | Ely et al. |
| 10,962,935 B1 | 3/2021 | Ely et al. |
| 10,987,054 B2 | 4/2021 | Pandya et al. |
| 11,000,193 B2 | 5/2021 | Tal et al. |
| 11,002,572 B2 | 5/2021 | Boonsom et al. |
| 11,029,831 B2 | 6/2021 | Block et al. |
| 11,036,318 B2 | 6/2021 | Kuboyama |
| 11,148,292 B2 | 10/2021 | Bryner et al. |
| 11,181,863 B2 | 11/2021 | Ely et al. |
| 11,194,298 B2 | 12/2021 | Roach et al. |
| 11,194,299 B1 | 12/2021 | Taylor et al. |
| 11,221,590 B2 | 1/2022 | Rothkopf et al. |
| 11,347,189 B1 | 5/2022 | Herrera et al. |
| 11,347,351 B2 | 6/2022 | Shedletsky et al. |
| 11,385,599 B2 | 7/2022 | Ely et al. |
| 11,474,483 B2 | 10/2022 | Rothkopf |
| 11,513,613 B2 | 11/2022 | Bushnell et al. |
| 11,531,306 B2 | 12/2022 | Ely et al. |
| 11,537,082 B2 * | 12/2022 | Ferri ...................... G04C 3/002 |
| 11,561,515 B2 * | 1/2023 | Beyhs ................... G04G 9/007 |
| 2002/0101457 A1 | 8/2002 | Lang |
| 2003/0174590 A1 | 9/2003 | Arikawa et al. |
| 2004/0047244 A1 | 3/2004 | Iino et al. |
| 2004/0082414 A1 | 4/2004 | Knox |
| 2004/0130971 A1 | 7/2004 | Ecoffet et al. |
| 2004/0264301 A1 | 12/2004 | Howard et al. |
| 2005/0075558 A1 | 4/2005 | Vecerina et al. |
| 2005/0088417 A1 | 4/2005 | Mulligan |
| 2006/0250377 A1 | 11/2006 | Zadesky et al. |
| 2007/0013775 A1 | 1/2007 | Shin |
| 2007/0050054 A1 | 3/2007 | Sambandam Guruparan et al. |
| 2007/0182708 A1 | 8/2007 | Poupyrev et al. |
| 2007/0211042 A1 | 9/2007 | Kim et al. |
| 2007/0222756 A1 | 9/2007 | Wu et al. |
| 2007/0229671 A1 | 10/2007 | Takeshita et al. |
| 2007/0247421 A1 | 10/2007 | Orsley et al. |
| 2008/0130914 A1 | 6/2008 | Cho |
| 2009/0051649 A1 | 2/2009 | Rondel |
| 2009/0073119 A1 | 3/2009 | Le et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0285443 A1 | 11/2009 | Camp et al. |
| 2009/0312051 A1 | 12/2009 | Hansson et al. |
| 2009/0312655 A1 | 12/2009 | Lo |
| 2010/0033430 A1 | 2/2010 | Kakutani et al. |
| 2010/0053468 A1 | 3/2010 | Havrill |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0158057 A1 | 6/2011 | Brewer et al. |
| 2011/0242064 A1 | 10/2011 | Ono et al. |
| 2011/0270358 A1 | 11/2011 | Davis et al. |
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0191220 A1 | 7/2013 | Dent et al. |
| 2013/0235704 A1 | 9/2013 | Grinberg |
| 2013/0261405 A1 | 10/2013 | Lee et al. |
| 2013/0335196 A1 | 12/2013 | Zhang et al. |
| 2014/0009397 A1 | 1/2014 | Gillespie |
| 2014/0045547 A1 | 2/2014 | Singamsetty et al. |
| 2014/0071098 A1 | 3/2014 | You |
| 2014/0073486 A1 | 3/2014 | Ahmed et al. |
| 2014/0132516 A1 | 5/2014 | Tsai et al. |
| 2014/0197936 A1 | 7/2014 | Biggs et al. |
| 2014/0340318 A1 | 11/2014 | Stringer et al. |
| 2014/0347289 A1 | 11/2014 | Suh et al. |
| 2014/0368442 A1 | 12/2014 | Vahtola |
| 2014/0375579 A1 | 12/2014 | Fujiwara |
| 2015/0049059 A1 | 2/2015 | Zadesky et al. |
| 2015/0098309 A1 | 4/2015 | Adams et al. |
| 2015/0124415 A1 | 5/2015 | Goyal et al. |
| 2015/0186609 A1 | 7/2015 | Utter, II |

(56) References Cited

U.S. PATENT DOCUMENTS

| | | |
|---|---|---|
| 2015/0221460 A1 | 8/2015 | Teplitxky et al. |
| 2015/0293592 A1 | 10/2015 | Cheong |
| 2015/0320346 A1 | 11/2015 | Chen |
| 2015/0338642 A1 | 11/2015 | Sanford |
| 2015/0341031 A1 | 11/2015 | Marquas et al. |
| 2015/0366098 A1 | 12/2015 | Lapetina et al. |
| 2016/0018846 A1 | 1/2016 | Zenoff |
| 2016/0054813 A1 | 2/2016 | Shediwy et al. |
| 2016/0058375 A1 | 3/2016 | Rothkopf et al. |
| 2016/0061636 A1 | 3/2016 | Gowreesunker et al. |
| 2016/0062623 A1 | 3/2016 | Howard et al. |
| 2016/0069713 A1 | 3/2016 | Ruh et al. |
| 2016/0109861 A1 | 4/2016 | Kim et al. |
| 2016/0116306 A1 | 4/2016 | Ferri et al. |
| 2016/0147432 A1 | 5/2016 | Shi et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0241688 A1 | 8/2016 | Vossoughi |
| 2016/0253487 A1 | 9/2016 | Sarkar et al. |
| 2016/0306446 A1 | 10/2016 | Chung et al. |
| 2016/0320583 A1 | 11/2016 | Hall, Jr. |
| 2016/0327911 A1 | 11/2016 | Eim et al. |
| 2016/0338642 A1 | 11/2016 | Parara et al. |
| 2016/0378069 A1 | 12/2016 | Rothkopf et al. |
| 2016/0378070 A1 | 12/2016 | Rothkopf et al. |
| 2016/0378071 A1 | 12/2016 | Rothkopf et al. |
| 2017/0011210 A1 | 1/2017 | Cheong et al. |
| 2017/0027461 A1 | 2/2017 | Shin et al. |
| 2017/0031449 A1 | 2/2017 | Karsten et al. |
| 2017/0045958 A1 | 2/2017 | Battlogg et al. |
| 2017/0061863 A1 | 3/2017 | Eguchi |
| 2017/0069443 A1 | 3/2017 | Wang et al. |
| 2017/0069444 A1 | 3/2017 | Wang et al. |
| 2017/0069447 A1 | 3/2017 | Wang et al. |
| 2017/0090572 A1 | 3/2017 | Holenarsipur |
| 2017/0090599 A1 | 3/2017 | Kuboyama |
| 2017/0104902 A1 | 4/2017 | Kim et al. |
| 2017/0139489 A1 | 5/2017 | Chen et al. |
| 2017/0216519 A1 | 8/2017 | Vouillamoz |
| 2017/0216668 A1 | 8/2017 | Burton et al. |
| 2017/0238138 A1 | 8/2017 | Aminzade |
| 2017/0251561 A1 | 8/2017 | Fleck et al. |
| 2017/0269715 A1 | 9/2017 | Kim et al. |
| 2017/0285404 A1 | 10/2017 | Kubota et al. |
| 2017/0301314 A1 | 10/2017 | Kim et al. |
| 2017/0307414 A1 | 10/2017 | Ferri et al. |
| 2017/0331869 A1 | 11/2017 | Bendahan et al. |
| 2017/0357465 A1 | 12/2017 | Dzeryn et al. |
| 2018/0018026 A1 | 1/2018 | Bushnell et al. |
| 2018/0059624 A1 | 3/2018 | James |
| 2018/0136613 A1 | 5/2018 | Ely et al. |
| 2018/0136686 A1 | 5/2018 | Jackson et al. |
| 2018/0196517 A1 | 7/2018 | Tan et al. |
| 2018/0225701 A1 | 8/2018 | Han |
| 2018/0235491 A1 | 8/2018 | Bayley et al. |
| 2018/0239306 A1 | 8/2018 | Ely |
| 2018/0299834 A1 | 10/2018 | Ely et al. |
| 2018/0307363 A1 | 10/2018 | Ely et al. |
| 2018/0329368 A1 | 11/2018 | Ely et al. |
| 2018/0335891 A1 | 11/2018 | Shedletsky et al. |
| 2018/0337551 A1 | 11/2018 | Park |
| 2018/0341342 A1 | 11/2018 | Bushnell et al. |
| 2018/0364815 A1 | 12/2018 | Moussette et al. |
| 2019/0017846 A1 | 1/2019 | Boonsom et al. |
| 2019/0056700 A1 | 2/2019 | Matsuno |
| 2019/0072902 A1 | 3/2019 | Ely et al. |
| 2019/0072911 A1 | 3/2019 | Ely et al. |
| 2019/0072912 A1 | 3/2019 | Pandya et al. |
| 2019/0082547 A1 | 3/2019 | Werner et al. |
| 2019/0088583 A1 | 3/2019 | Ashikaga et al. |
| 2019/0146415 A1 | 5/2019 | Ely et al. |
| 2019/0163324 A1 | 5/2019 | Shedletsky |
| 2019/0250754 A1 | 8/2019 | Ely et al. |
| 2019/0278232 A1 | 9/2019 | Ely et al. |
| 2019/0294117 A1 | 9/2019 | Ely et al. |
| 2019/0302902 A1 | 10/2019 | Bushnell et al. |
| 2019/0317454 A1 | 10/2019 | Holenarsipur et al. |
| 2019/0391539 A1 | 12/2019 | Perkins et al. |
| 2020/0041962 A1 | 2/2020 | Beyhs |
| 2020/0064774 A1 | 2/2020 | Ely et al. |
| 2020/0064779 A1 | 2/2020 | Pandya et al. |
| 2020/0073339 A1 | 3/2020 | Roach et al. |
| 2020/0110473 A1 | 4/2020 | Bushnell et al. |
| 2020/0159172 A1 | 5/2020 | Bushnell et al. |
| 2020/0233380 A1 | 7/2020 | Rothkopf |
| 2020/0233529 A1 | 7/2020 | Shedletsky et al. |
| 2020/0271483 A1 | 8/2020 | Boonsom |
| 2020/0310609 A1 | 10/2020 | Ham |
| 2020/0326659 A1 | 10/2020 | Ely et al. |
| 2021/0055696 A1 | 2/2021 | Ely |
| 2021/0060783 A1 | 3/2021 | Bryner et al. |
| 2021/0096688 A1 | 4/2021 | Shedletsky et al. |
| 2021/0181682 A1 | 6/2021 | Ely et al. |
| 2021/0181688 A1 | 6/2021 | Ely et al. |
| 2021/0181690 A1 | 6/2021 | Rothkopf et al. |
| 2021/0181691 A1 | 6/2021 | Rothkopf et al. |
| 2021/0181692 A1 | 6/2021 | Rothkopf et al. |
| 2021/0181865 A1 | 6/2021 | Bushnell et al. |
| 2021/0255590 A1 | 8/2021 | Ely et al. |
| 2021/0303081 A1 | 9/2021 | Kuboyama et al. |
| 2021/0373501 A1 | 12/2021 | Pandya et al. |
| 2021/0405594 A1 | 12/2021 | Holenarsipur et al. |
| 2022/0043397 A1 | 2/2022 | Ely et al. |
| 2022/0043402 A1 | 2/2022 | Roach et al. |
| 2022/0075328 A1 | 3/2022 | Taylor |
| 2022/0171344 A1 | 6/2022 | Rothkopf et al. |
| 2022/0261111 A1 | 8/2022 | Shedletsky et al. |
| 2022/0299944 A1 | 9/2022 | Ely |
| 2022/0326660 A1 | 10/2022 | Perkins |

FOREIGN PATENT DOCUMENTS

| | | |
|---|---|---|
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 101404928 | 4/2009 |
| CN | 201262741 | 6/2009 |
| CN | 101750958 | 6/2010 |
| CN | 201638168 | 11/2010 |
| CN | 101923314 | 12/2010 |
| CN | 102067070 | 5/2011 |
| CN | 102216959 | 10/2011 |
| CN | 202008579 | 10/2011 |
| CN | 102590925 | 7/2012 |
| CN | 102741772 | 10/2012 |
| CN | 102890443 | 1/2013 |
| CN | 202710937 | 1/2013 |
| CN | 103177891 | 6/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 204496177 | 7/2015 |
| CN | 104880937 | 9/2015 |
| CN | 104898406 | 9/2015 |

(56) References Cited

FOREIGN PATENT DOCUMENTS

| | | |
|---|---|---|
| CN | 204650147 | 9/2015 |
| CN | 105022947 | 11/2015 |
| CN | 105096979 | 11/2015 |
| CN | 105339871 | 2/2016 |
| CN | 105547146 | 5/2016 |
| CN | 105556433 | 5/2016 |
| CN | 105683876 | 6/2016 |
| CN | 105760067 | 7/2016 |
| CN | 105955519 | 9/2016 |
| CN | 205645648 | 10/2016 |
| CN | 205721636 | 11/2016 |
| CN | 205750744 | 11/2016 |
| CN | 106236051 | 12/2016 |
| CN | 106557218 | 4/2017 |
| CN | 206147524 | 5/2017 |
| CN | 206209589 | 5/2017 |
| CN | 107111342 | 8/2017 |
| CN | 107122088 | 9/2017 |
| CN | 107966895 | 4/2018 |
| CN | 209560397 | 10/2019 |
| CN | 209625187 | 11/2019 |
| CN | 106125968 | 11/2022 |
| DE | 3706194 | 9/1988 |
| DE | 102008023651 | 11/2009 |
| DE | 102016215087 | 3/2017 |
| EP | 0165548 | 12/1985 |
| EP | 0556155 | 8/1993 |
| EP | 1345095 | 9/2003 |
| EP | 1519452 | 3/2005 |
| EP | 1669724 | 6/2006 |
| EP | 1832969 | 9/2007 |
| EP | 2375295 | 10/2011 |
| EP | 2579186 | 4/2013 |
| EP | 2720129 | 4/2014 |
| EP | 2884239 | 6/2015 |
| FR | 2030093 | 10/1970 |
| FR | 2801402 | 5/2001 |
| GB | 2433211 | 6/2007 |
| JP | S52151058 | 12/1977 |
| JP | S52164551 | 12/1977 |
| JP | S53093067 | 8/1978 |
| JP | S54087779 | 6/1979 |
| JP | S5708582 | 1/1982 |
| JP | S5734457 | 2/1982 |
| JP | S60103936 | 6/1985 |
| JP | S60103937 | 6/1985 |
| JP | H02285214 | 11/1990 |
| JP | H04093719 | 3/1992 |
| JP | H04157319 | 5/1992 |
| JP | H05203465 | 8/1993 |
| JP | H05312595 | 11/1993 |
| JP | H06050927 | 12/1994 |
| JP | H06331761 | 12/1994 |
| JP | H06347293 | 12/1994 |
| JP | H07116141 | 5/1995 |
| JP | H0914941 | 1/1997 |
| JP | H10161811 | 6/1998 |
| JP | H11121210 | 4/1999 |
| JP | H11191508 | 7/1999 |
| JP | 2000258559 | 9/2000 |
| JP | 2000316824 | 11/2000 |
| JP | 2000337892 | 12/2000 |
| JP | 2001084934 | 3/2001 |
| JP | 2001167651 | 6/2001 |
| JP | 2001202178 | 7/2001 |
| JP | 2001215288 | 8/2001 |
| JP | 2001524206 | 11/2001 |
| JP | 2002071480 | 3/2002 |
| JP | 2002165768 | 6/2002 |
| JP | 2003050668 | 2/2003 |
| JP | 2003151410 | 5/2003 |
| JP | 2003331693 | 11/2003 |
| JP | 2004184396 | 7/2004 |
| JP | 2004028979 | 11/2004 |
| JP | 2005017011 | 1/2005 |
| JP | 2005063200 | 3/2005 |
| JP | 2005099023 | 4/2005 |
| JP | 2005108630 | 4/2005 |
| JP | 2006101505 | 4/2006 |
| JP | 2006164275 | 6/2006 |
| JP | 3852854 | 12/2006 |
| JP | 2007101380 | 4/2007 |
| JP | 2007149620 | 6/2007 |
| JP | 2007248176 | 9/2007 |
| JP | 2007311153 | 11/2007 |
| JP | 2008053980 | 3/2008 |
| JP | 2008122124 | 5/2008 |
| JP | 2008122377 | 5/2008 |
| JP | 2008170436 | 7/2008 |
| JP | 2008235226 | 10/2008 |
| JP | 2009009382 | 1/2009 |
| JP | 2009070657 | 4/2009 |
| JP | 2009519737 | 5/2009 |
| JP | 2009540399 | 11/2009 |
| JP | 2010032545 | 2/2010 |
| JP | 2010515153 | 5/2010 |
| JP | 2010165001 | 7/2010 |
| JP | 2010186572 | 8/2010 |
| JP | 2010243344 | 10/2010 |
| JP | 2010244797 | 10/2010 |
| JP | 2011021929 | 2/2011 |
| JP | 2011165468 | 8/2011 |
| JP | 2011221659 | 11/2011 |
| JP | 2012053801 | 3/2012 |
| JP | 2013057516 | 3/2013 |
| JP | 2013079961 | 5/2013 |
| JP | 2013524189 | 6/2013 |
| JP | 3190075 | 4/2014 |
| JP | 5477393 | 4/2014 |
| JP | 2014512556 | 5/2014 |
| JP | 2014112222 | 6/2014 |
| JP | 2014174031 | 9/2014 |
| JP | 2018510451 | 4/2018 |
| KR | 20010030477 | 4/2001 |
| KR | 200278568 | 3/2002 |
| KR | WO2003/032538 | 4/2003 |
| KR | 20070011685 | 1/2007 |
| KR | 20070014247 | 2/2007 |
| KR | 100754674 | 9/2007 |
| KR | 20080028935 | 4/2008 |
| KR | 20080045397 | 5/2008 |
| KR | 2020100007563 | 7/2010 |
| KR | 20110011393 | 2/2011 |
| KR | 20110012784 | 2/2011 |
| KR | 20110103761 | 9/2011 |
| KR | 20110113368 | 10/2011 |
| KR | 20130036038 | 4/2013 |
| KR | 20130131873 | 12/2013 |
| KR | 20140051391 | 4/2014 |
| KR | 20140064689 | 5/2014 |
| KR | 20140104388 | 8/2014 |
| KR | 20160017070 | 2/2016 |
| KR | 20160048967 | 5/2016 |
| KR | 20170106395 | 9/2017 |
| NL | 1040225 | 11/2014 |
| RO | 129033 | 11/2013 |
| TW | 200633681 | 10/2006 |
| WO | WO2001/022038 | 3/2001 |
| WO | WO2001/069567 | 9/2001 |
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2014/200766 | 12/2014 |
| WO | WO2015/147756 | 10/2015 |
| WO | WO2016080669 | 5/2016 |
| WO | WO2016/104922 | 6/2016 |
| WO | WO2016/155761 | 10/2016 |
| WO | WO2016196171 | 12/2016 |
| WO | WO2016208835 | 12/2016 |

(56) References Cited

FOREIGN PATENT DOCUMENTS

| WO | WO2017/013278 | 1/2017 |
|----|---------------|--------|
| WO | WO2020173085 | 9/2020 |

OTHER PUBLICATIONS

Author Unknown, "Fossil Q ups smartwatch game with handsome design and build," Business Mirror, Makati City, Philippines, 3 pages, Dec. 20, 2016.

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.

Author Unknown, "mHealth," http://mhealth.vesag.com/?m=201012, 7 pages, Dec. 23, 2010.

Author Unknown, "mHealth Summit 2010," http://www.virtualpressoffice.com/eventsSubmenu.do?page=exhibitorPage&showId=1551&companyId=5394, 5 pages, Nov. 18, 2010.

Author Unknown, "MyKronoz ZeTime: World's Most Funded Hybrid Smartwatch Raised over $3M on Kickstarter, Running until Apr. 27th," Business Wire, New York, New York, 3 pages, Apr. 21, 2017.

Author Unknown, "RedEye mini Plug-in Universal Remote Adapter for iPhone, iPod touch and iPad," Amazon.com, 4 pages, date unknown.

Author Unknown, "Re iPhone Universal Remote Control—Infrared Remote Control Accessory for iPhone and iPod touch," http://www.amazon.com/iPhone-Universal-Remote-Control-Accessory/dp/tech-data/B0038Z4 . . . , 2 pages, at least as early as Jul. 15, 2010.

Author Unknown, "Vesag Wrist Watch for Dementia Care from Vyzin," http://vyasa-kaaranam-ketkadey.blogspot.com/2011/03/vesag-wrist-watch-for-dementia-care.html, 2 pages, Mar. 31, 2011.

Author Unknown, "Vyzin Electronics Private Limited launches Vesag Watch," http://www.virtualpressoffice.com/showJointPage.do?page=jp&showId=1544, 5 pages, Jan. 6, 2011.

Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.

Author Unknown, "DeskThorityNet, Optical Switch Keyboards," http://deskthority.net/keyboards-f2/optical-switch-keyboards-t1474.html, 22 pages, Jul. 11, 2015.

Epstein et al., "Economical, High-Performance Optical Encoders," Hewlett-Packard Journal, pp. 99-106, Oct. 1988. [text only version].

GreyB, "Google Watch: Convert your arm into a keyboard," http://www.whatafuture.com/2014/02/28/google-smartwatch/#sthash.Yk35cDXK.dpbs, 3 pages, Feb. 28, 2014.

IBM, "Additional Functionality Added to Cell Phone via "Learning" Function Button," www.ip.com, 2 pages, Feb. 21, 2007.

Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.

Krishnan et al., "A Miniature Surface Mount Reflective Optical Shaft Encoder," Hewlett-Packard Journal, Article 8, pp. 1-6, Dec. 1996.

Narayanaswami et al., "Challenges and considerations for the design and production of a purpose-optimized body-worn wristwatch computer," Defense, Security, and Cockpit Displays, 2004.

M.T. Raghunath et al., User Interfaces for Applications on a Wrist Watch, Personal and Ubiquitous Computing, vol. 6, No. 1, 2002, Springer.

Rick, "How Vesag Helps Health Conscious Citizens," http://sensetekgroup.com/2010/11/29/wireless-health-monitoring-system/, 2 pages, Nov. 29, 2010.

Sadhu, Rajendra, "How Vesag Helps People Who Want to 'Be There'?," http://ezinearticles.com/?How-Vesag-Helps-People-Who-Want-to-Be-There?&id=5423873, 1 page, Nov. 22, 2010.

Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.

Sherr, Sol, "Input Devices," p. 55, Mar. 1988.

Tran et al., "Universal Programmable Remote Control/Telephone," www.ip.com, 2 pages, May 1, 1992.

U.S. Appl. No. 17/377,482, filed Jul. 16, 2021, pending.
U.S. Appl. No. 17/840,222, filed Jun. 14, 2022, pending.
U.S. Appl. No. 17/899,498, filed Aug. 31, 2022, pending.
U.S. Appl. No. 17/951,020, filed Sep. 22, 2022, pending.
U.S. Appl. No. 17/951,973, filed Sep. 23, 2022, pending.
U.S. Appl. No. 17/989,057, filed Nov. 17, 2022, pending.
U.S. Appl. No. 18/074,358, filed Dec. 2, 2022, pending.
U.S. Appl. No. 18/075,253, filed Dec. 5, 2022, pending.

* cited by examiner

CROWN FOR AN ELECTRONIC WATCH

CROSS-REFERENCE TO RELATED APPLICATION(S)

This application is a continuation patent application of U.S. patent application Ser. No. 16/191,349, filed Nov. 14, 2018, and titled "Crown for an Electronic Watch" and claims the benefit of U.S. Provisional Patent Application No. 62/713,745, filed Aug. 2, 2018 and titled "Crown for an Electronic Watch," the disclosures of which are hereby incorporated herein by reference in their entirety.

FIELD

The described embodiments relate generally to electronic devices, and more particularly to a crown for a wearable electronic device.

BACKGROUND

Electronic devices frequently use physical input devices to facilitate user interaction. For example, buttons, keys, dials, and the like can be physically manipulated by users to control operations of the device. Physical input devices may use various types of sensing mechanisms to translate the physical manipulation to signals usable by the electronic device. For example, buttons and keys may use collapsible dome switches to detect presses, while dials and other rotating input devices may use encoders or resolvers to detect rotational movements.

SUMMARY

An electronic watch includes a housing defining a side surface of the electronic watch, a transparent cover coupled to the housing and defining a front surface of the electronic watch, an image-sensing element, and a crown extending from the side of the housing and defining an imaging surface. The crown may include a light-directing feature configured to direct, onto the image-sensing element, an image of an object in contact with the imaging surface.

The electronic watch may further include a display positioned at least partially within the housing, and a touch sensor positioned below the transparent cover and configured to detect touch inputs applied to the transparent cover. The crown may include a head having a light-transmissive portion defining the imaging surface, and a light-transmissive shaft configured to receive light from the light-directing feature. The light-transmissive portion of the head may be transparent to infrared radiation and opaque to visible light. The light-transmissive shaft may be configured to guide the light to the image-sensing element. The head and the light-transmissive shaft may be portions of a monolithic light-transmissive member.

The light-directing feature may include an interface between a first material and a second material, the interface configured to reflect incident light. The first material may be a light-transmissive solid, and the second material may be air. The interface between the first material and the second material may be at least partially defined by an angled surface, and the angled surface may cause the incident light to be reflected towards the image-sensing element.

A wearable electronic device may include a housing, a display positioned at least partially within the housing, a crown at least partially external to the housing and defining an imaging surface along a peripheral portion of the crown, and an image-sensing element within the housing and configured to receive an image of an object in contact with the imaging surface. The imaging surface may be defined by a semi-transparent mirror coating.

The crown may include a light-transmissive member defining an angled surface configured to direct light from the imaging surface to the image-sensing element. The angled surface may have an angle configured to produce total internal reflection of the light. The wearable electronic device may further include a reflective material applied to the angled surface.

The light-transmissive member may at least partially define a head of the crown and a shaft of the crown. The wearable electronic device may further include a light source at least partially within the housing and configured to illuminate the object.

An electronic watch may include a housing, a display positioned at least partially within the housing, an image sensor at least partially within the housing and comprising an image-sensing element, and a crown. The crown may include a head portion defining an imaging surface external to the housing, a shaft portion extending at least partially into the housing, and a reflective feature directing light from the imaging surface through the shaft portion and towards the image-sensing element. The electronic watch may further include a transparent cover covering the display and a sensor configured to detect touch events applied to the transparent cover.

The reflective feature may include a curved surface configured to magnify an image of an object in contact with the imaging surface. The curved surface may define an interface between the head portion and air.

The crown may further include a cover member coupled to an end of the head portion. The head portion may define a cylindrical peripheral surface, and a peripheral surface of the cover member may be flush with the cylindrical peripheral surface of the head portion.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
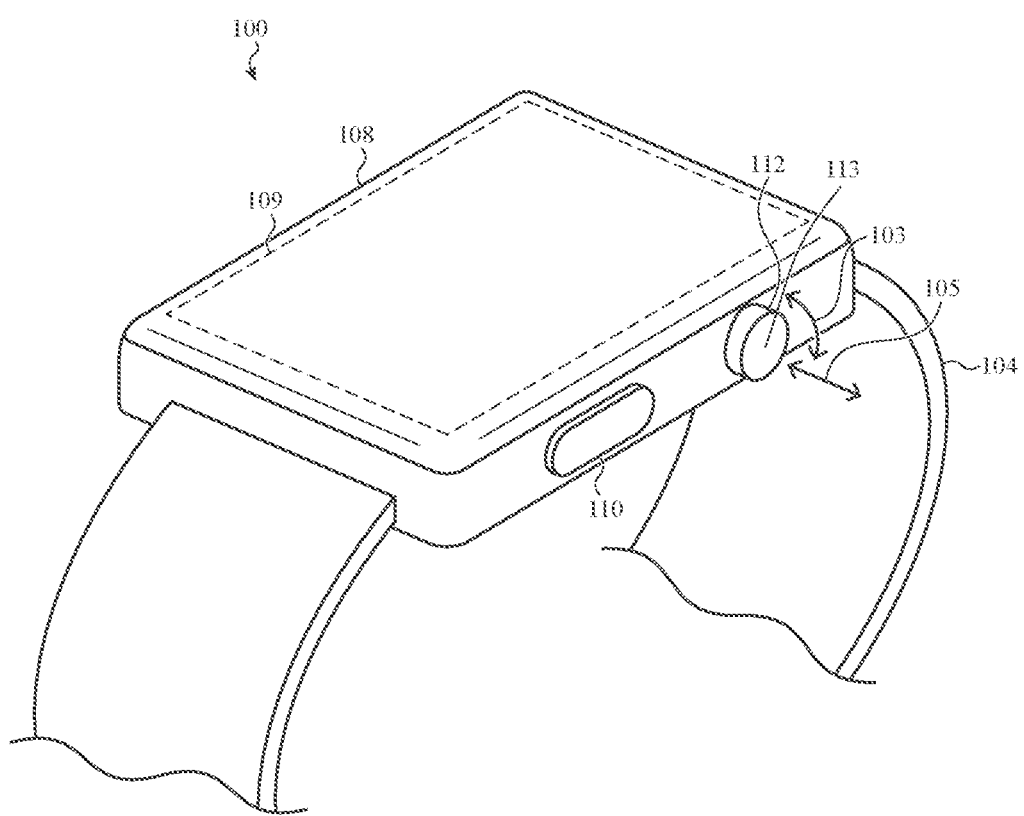
FIGS. 1A-1B depict an example wearable electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a crown of a wearable electronic device, such as an electronic watch (also referred to as a smart watch), and more particularly to a crown that includes an optical sensing system to detect user interactions with the crown. For example, users may interact with a crown by rotating the crown or, in the case of a crown that is rotationally constrained, sliding a finger over a surface of the crown. In order to sense the motion of the user's finger, a crown as described herein may include a window on the part of the crown that the user touches when interacting with the crown. The window may allow an image of the user's finger to be captured by an image sensor that is positioned within the housing. The image sensor, which may include an image-sensing element (e.g., a charge-coupled device (CCD)) in conjunction with associated processors and other components within the electronic watch, may determine how the user's finger has moved and control the operation of the electronic watch accordingly. For example, the watch may determine a speed and a direction of motion of the user's finger (or other suitable parameter), and cause a graphical output that is displayed on the watch's display to move at a speed and along a direction that is indicated by the detected motion.

As used herein, an image may refer to an optical representation of an object, which may be produced, transmitted, or propagated by lenses, mirrors, or the like. An image may be captured and stored, by an image sensor, as a multidimensional array having pixels that represent a small portion of the image formed on the image sensor. The multidimensional array may be stored as a single frame (e.g., a photograph) or a series of frames (e.g., a video). In order to detect motion using the image (e.g., the stored image), the image sensor may analyze multiple frames to determine, for example, a speed and direction of one or more features in the image. The features that are analyzed may include features of a user's skin (e.g., fingerprints, hair follicles), or any other optically detectable feature, texture, surface irregularity, image, or the like, of any object. In this way, the device may be responsive to skin (e.g., the skin of a user's finger or hand), a stylus, a gloved finger, or any other suitable object with optically detectable features. As used herein, analysis of an image by an image sensor and/or other components of an electronic device may refer to an analysis of a stored image (e.g., the stored multidimensional array, which may be a digital photograph or a video).

To facilitate capturing an image of the user's finger (or other implement used to interact with the crown), the crown may include light-transmissive materials and light-directing features that direct light (corresponding to an image of the user's finger) through the crown and onto an image-sensing element of an image sensor. For example, a peripheral surface of the crown (e.g., the cylindrical peripheral surface that a user touches to rotate the crown) may be light-transmissive, and the crown may have a reflecting feature to direct light from the peripheral surface onto the image-sensing element. In one such example, the crown may include a monolithic light-transmissive member that defines both a head portion and a shaft portion of the crown, as well as an angled surface that causes light (e.g., the light corresponding to an image of the user's finger) to be reflected at an approximately 90 degree angle so that the light may be directed through the shaft and into an enclosure of the watch. More particularly, when a user places a finger on the peripheral surface of the head, the light corresponding to an image of the user's finger may be initially directed into the head along a radial direction (relative to the cylindrical peripheral surface of the head). However, an image-sensing element may be within the housing along an axial direction of the head. Accordingly, the head may have an angled surface formed into the material that effectively changes the direction of the light (e.g., reflects or otherwise redirects the light) so that the light is directed along the axis of the crown and into the watch. In this way, the image of the user's finger (or other implement or object) is directed onto an image-sensing element within the watch, allowing the watch to analyze the image and control the operation of the device accordingly.

The optical crown system described herein may be used with both freely rotatable crowns (e.g., crowns that can rotate about an axis an indefinite number of turns) as well as rotationally constrained crowns. As used herein, a "rotationally constrained" crown or component refers to a component that is not free to rotate more than a full revolution under normal use conditions (e.g., when manipulated by the hands of a person). Thus, rotationally constrained components include both rotationally fixed components and partially rotatable components.

In the case of a rotationally constrained crown, if a user attempts to rotate the crown to operate the device, the crown may not physically rotate. Instead, the user's fingers may slide along a surface of the crown while the crown remains stationary. As used herein, a finger or object "sliding" along a surface may refer to the finger (or other object) moving along the surface of the crown while the finger (or other object) is in contact with the surface. In the case of a rotating crown, as the user's finger moves forward to rotate the crown, the part of the user's finger that is touching the crown changes. In either case, as the user's finger moves, the image that is projected or incident on the image-sensing element may include a moving image of the surface of the user's finger. The image sensor may analyze the movement of the image to determine how to manipulate the graphical output or other property of the watch. The image sensor may use features of the user's skin, such as the ridges of the user's skin (or any other texture or optically detectable feature), to determine the speed and direction of motion.

Advantageously, the crown described herein can detect inputs even under conditions when other types of touch sensors may fail. For example, some touch-sensing technologies use capacitive sensors to detect touch events or inputs. The effectiveness of capacitive sensors may be reduced, however, by gloves, clothing, overly wet or dry skin, lotions, or the like. By detecting motion via images, the optical sensing structures described herein may avoid such negative effects and may operate effectively over a broader range of conditions and may sense movement of objects other than bare skin.

Figure 1B:
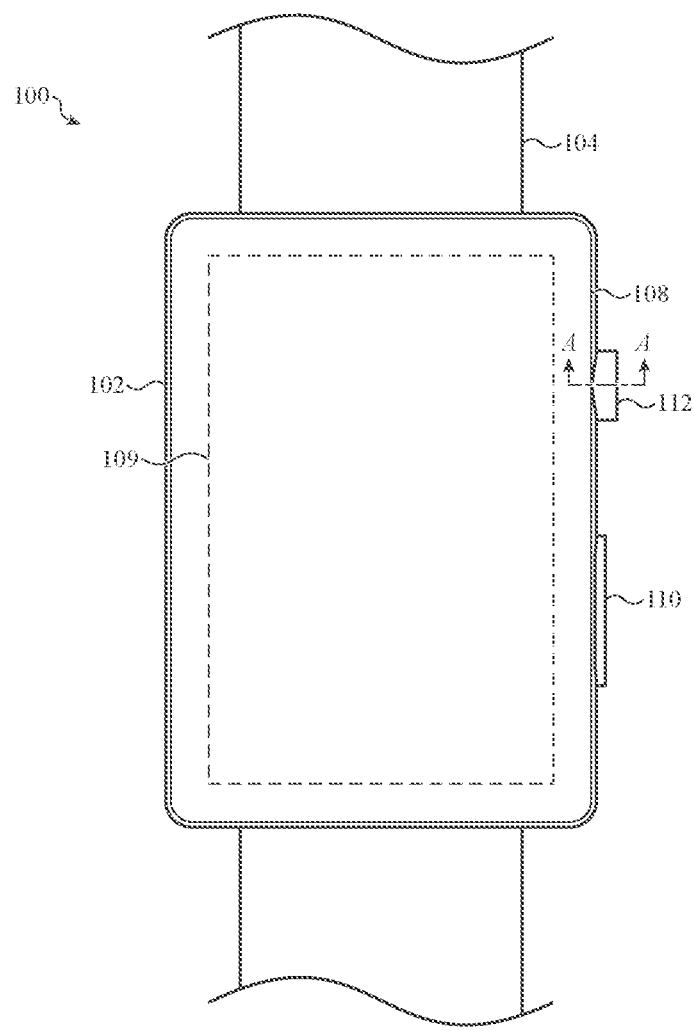

FIGS. 1A-1B depict an electronic device 100. The electronic device 100 is depicted as an electronic watch, though this is merely one example embodiment of an electronic device and the concepts discussed herein may apply equally or by analogy to other electronic devices, including mobile phones (e.g., smartphones), tablet computers, notebook computers, head-mounted displays, digital media players (e.g., mp3 players), or the like.

The electronic device 100 includes a housing 102 and a band 104 coupled to the housing. The band 104 may be configured to attach the electronic device 100 to a user, such as to the user's arm or wrist.

The electronic device 100 also includes a transparent cover 108 coupled to the housing 102. The cover 108 may define a front face of the electronic device 100. For example, in some cases, the cover 108 defines substantially the entire front face and/or front surface of the electronic device. The cover 108 may also define an input surface of the device 100. For example, as described herein, the device 100 may include touch and/or force sensors that detect inputs applied to the cover 108. The cover 108 may be formed from or include glass, sapphire, a polymer, a dielectric, or any other suitable material.

The cover 108 may cover at least part of a display 109 that is positioned at least partially within the housing 102. The display 109 may define an output region in which graphical outputs are displayed. Graphical outputs may include graphical user interfaces, user interface elements (e.g., buttons, sliders, etc.), text, lists, photographs, videos, or the like. The display 109 may include a liquid-crystal display (LCD), organic light emitting diode display (OLED), or any other suitable components or display technology.

The display 109 may include or be associated with touch sensors and/or force sensors that extend along the output region of the display and which may use any suitable sensing elements and/or sensing techniques. Using touch sensors, the device 100 may detect touch inputs applied to the cover 108, including detecting locations of touch inputs, motions of touch inputs (e.g., the speed, direction, or other parameters of a gesture applied to the cover 108), or the like. Using force sensors, the device 100 may detect amounts or magnitudes of force associated with touch events applied to the cover 108. The touch and/or force sensors may detect various types of user inputs to control or modify the operation of the device, including taps, swipes, multi-finger inputs, single- or multi-finger touch gestures, presses, and the like. Touch and/or force sensors usable with wearable electronic devices, such as the device 100, are described herein with respect to FIG. 12.

The electronic device 100 also includes a crown 112 having a head, protruding portion, or component(s) or feature(s) positioned along a side surface of the housing 102. At least a portion of the crown 112 may protrude from the housing 102, and may define a generally circular shape or a circular exterior surface. The exterior surface of the crown 112 may be textured, knurled, grooved, or may otherwise have features that may improve the tactile feel of the crown 112 and/or facilitate rotation sensing. The exterior surface of the crown 112 may also have one or more light-transmissive areas, such as a light-transmissive window, that define one or more imaging surfaces. An imaging surface may refer to a surface that allows an image to be captured of an object (e.g., a finger) that is touching that surface. For example, a light-transmissive window may allow an image to be captured, through the window, of a finger that is in contact with the window. Accordingly, the light-transmissive window may define an imaging surface.

The imaging surface or surfaces may enable the device 100 to capture an image of the user's finger while the finger is interacting with the crown 112 (e.g., in order to determine input parameters such as a speed and direction of an input, as described herein). The light-transmissive areas may be transparent to some wavelengths of light and substantially opaque to others. For example, if the device 100 uses infrared imaging to capture an image of the user's finger, the light-transmissive areas may be transparent to infrared wavelengths while being opaque to visible light.

Figure 2A:
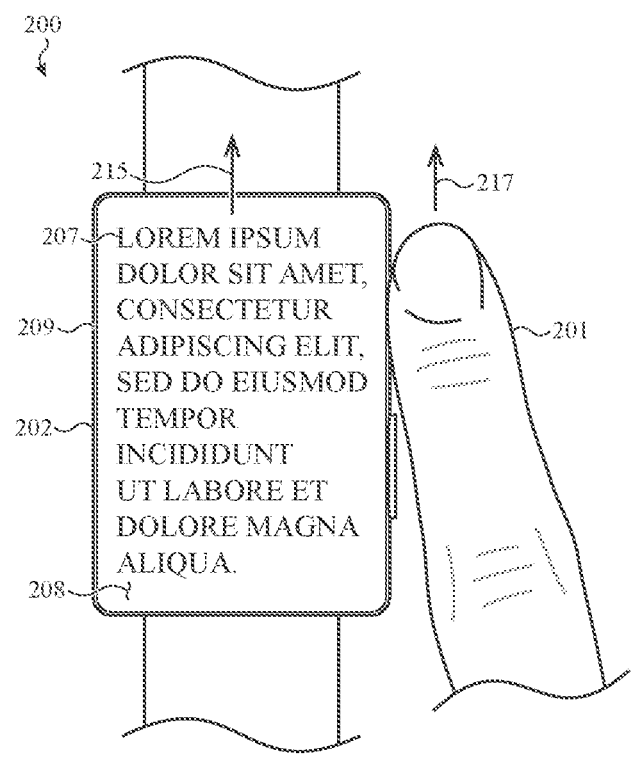
FIGS. 2A-2B depict an example wearable electronic device being used.
Figure 2B:
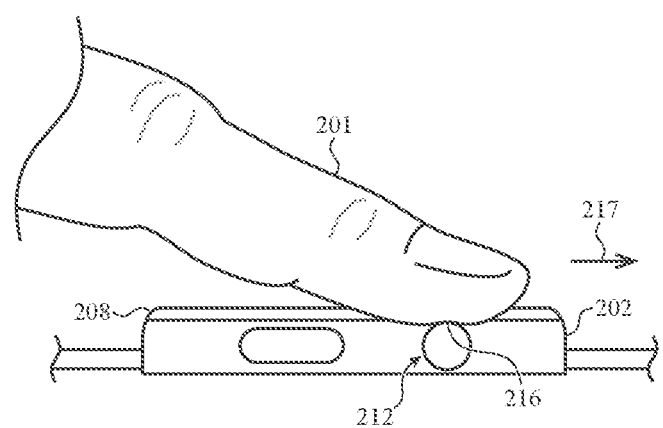

The crown 112 may afford a variety of potential user interactions. For example, the crown 112 may be rotationally constrained (e.g., rotationally fixed or partially rotatable), and may include or be associated with sensors that detect when a user slides one or more fingers along a surface of the crown 112 in a movement that resembles rotating the crown 112 (or that would result in rotation of a freely rotating crown). More particularly, where the crown 112 is rotationally fixed or rotationally constrained, a user input that resembles a twisting or rotating motion may not actually result in any substantial physical rotation that can be detected for the purposes of registering an input. Rather, the user's fingers (or other object) will move in a manner that resembles twisting, turning, or rotating, but does not actually continuously rotate the crown 112. As another example gesture that may be detected, a user attempting to rotate a rotationally fixed crown by applying a substantially tangential force to a surface of the crown 112 (as shown in FIGS. 2A-2B, for example) may also result in a sliding gesture along a surface of the crown 112. Thus, in the case of a rotationally fixed or constrained crown 112, an image sensor within the device 100 may detect inputs that result from a gesture that has the same motion as (and thus may feel and look the same as or similar to) rotating a rotatable crown.

In some cases, the crown 112 may be rotationally free or may include a rotationally free member that is free to rotate relative to the housing 102. More particularly, the rotationally free member may have no rotational constraints, and thus may be capable of being rotated indefinitely (or a sufficiently large number of turns that a user does not typically reach a hard-stop under normal use conditions). Even where the crown 112 or a portion thereof can rotate, the crown 112 may be configured so that light reflected from the user's finger is directed from an imaging surface of the crown 112 onto an image-sensing element within the housing 102.

Thus, both rotationally constrained and rotationally free crowns may detect gestures resembling a twisting, turning, or rotating motion, regardless of whether the crown rotates or not. As used herein, a twisting, turning, or rotating motion applied to a crown may be referred to as a gesture input or a rotational input (even if the crown itself does not physically rotate).

In cases where the crown 112, or a member or component of the crown 112, is capable of some rotation, it may rotate about a rotation axis (e.g., it may rotate as indicated by arrow 103 in FIG. 1A). The crown 112, or a member or component of the crown 112, may also be translatable relative to the housing 102 to accept axial inputs. For example, the crown 112 may be movable or translatable along the rotation axis, towards and/or away from the housing 102 (as indicated by arrow 105 in FIG. 1A). The crown 112 may therefore be manipulated by pushing and/or pulling on the crown 112.

The crown 112 may be able to translate any suitable distance. For example, a crown 112 may include a dome switch to register axial inputs, and the crown 112 may move a sufficient distance to facilitate physical actuation of the dome switch. In other cases, such as where a force sensor is used to detect axial inputs, the crown 112 may move a sufficient distance to facilitate force sensing. The distance that the crown 112 can translate or move may be any suitable distance, such as about 1 mm, 0.5 mm, 0.2 mm, 0.1 mm, 0.05 mm or any other suitable distance.

Alternatively, the crown 112 may be fixed or otherwise substantially non-translatable. In such cases, axial inputs applied to the crown 112 may be detected in other ways. For example, the crown 112 may include or be part of a contact sensor (described more fully below), such as a capacitive or resistive touch sensor, that determines when and optionally where a user's finger is in contact with the crown 112. The crown 112 may also use an optical sensing scheme to detect axial inputs. For example, as noted above, the crown 112 or a portion of the crown may be light-transmissive to allow light (corresponding to an image of the user's finger) to be directed from a peripheral surface of a head onto an image-sensing element. To facilitate axial input sensing, the crown 112 may also define an optical path from an end 113 of the crown 112 to an image-sensing element so that the image sensor can determine when a user's finger (or other object) is in contact with the end 113 of the crown 112.

The device 100 may include a force sensor to detect axial forces that are applied to the crown 112. The force sensor may include or use any suitable force sensing components and may use any suitable technique for sensing force inputs. For example, a force sensor may include a strain sensor, capacitive gap sensor, or other force sensitive structure that is configured to produce an electrical response that corresponds to an amount of force (e.g., axial force) applied to the crown 112. The electrical response may increase continuously as the amount of applied force increases, and as such may provide non-binary force sensing. Accordingly, the force sensor may determine, based on the electrical response of the force sensing components, one or more properties of the applied force associated with a touch input (e.g., a magnitude of the applied axial force).

As described herein, gesture inputs (e.g., rotational-style inputs applied to a rotationally free or rotationally constrained crown) and axial inputs (e.g., translations or axial forces) may control various operations and user interfaces of the electronic device 100. In particular, inputs to the crown 112 may modify the graphical output of the display 109. For example, a rotational movement of the crown 112 or a gesture applied to the crown 112 may zoom, scroll, or rotate a user interface or other object displayed on the display 109 (among other possible functions), while translational movements or axial inputs may select highlighted objects or icons, cause a user interface to return to a previous menu or display, or activate or deactivate functions (among other possible functions).

The crown 112 may also be associated with or include a contact sensor that is configured to detect contact between a user and the crown 112 (e.g., touch inputs or touch events applied to the crown 112). The contact sensor may detect even non-moving contacts between the user and the crown 112 (e.g., when the user touches the crown 112 but does not rotate the crown or apply a sliding gesture to the crown 112). Contact sensing functionality may be provided by the same optical sensing system that also detects gestures (e.g., a finger sliding along a surface of a crown or the housing), or it may be provided by a separate sensor. The contact sensor may include or use any suitable type of sensor(s), including capacitive sensors, resistive sensors, magnetic sensors, inductive sensors, optical sensors, or the like. In some cases, the crown 112 itself, or components of the crown, may be conductive and may define a conductive path between the user (e.g., the user's finger) and a contact sensor. For example, the crown may be formed from or include metal, and may itself act as an electrode for conductively coupling a capacitive sensor to the user.

The device 100 may also include one or more haptic actuators that are configured to produce a tactile output through the crown 112. For example, the haptic actuator may be coupled to the crown 112 and may be configured to impart a force to the crown 112. The force may cause the crown 112 to move (e.g., to oscillate or vibrate translationally and/or rotationally, or to otherwise move to produce a tactile output), which may be detectable by a user when the user is contacting the crown 112. The haptic actuator may produce tactile output by moving the crown 112 in any suitable way. For example, the crown 112 (or a component thereof) may be rotated (e.g., rotated in a single direction, rotationally oscillated, or the like), translated (e.g., moved along a single axis), or pivoted (e.g., rocked about a pivot point). In other cases, the haptic actuator may produce tactile outputs using other techniques, such as by imparting a force to the housing 102 (e.g., to produce an oscillation, vibration, impulse, or other motion), which may be perceptible to a user through the crown 112 and/or through other surfaces of the device 100, such as the cover 108, the housing 102, or the like. Any suitable type of haptic actuator and/or technique for producing tactile output may be used to produce these or other types of tactile outputs, including electrostatics, piezoelectric actuators, oscillating or rotating masses, ultrasonic actuators, reluctance force actuators, voice coil motors, Lorentz force actuators, or the like. In some cases, haptic outputs may be produced by collapsible domes, springs, or other mechanical components.

Tactile outputs may be used for various purposes. For example, tactile outputs may be produced when a user presses the crown 112 (e.g., applies an axial force to the crown 112) to indicate that the device 100 has registered the press as an input to the device 100. As another example, tactile outputs may be used to provide feedback when the device 100 detects a rotation of the crown 112 or a gesture being applied to the crown 112. For example, a tactile output may produce a repetitive "click" sensation as the user rotates the crown 112 or applies a gesture to the crown 112. Tactile outputs may be used for other purposes as well.

The electronic device 100 may also include other inputs, switches, buttons, or the like. For example, the electronic device 100 includes a button 110. The button 110 may be a movable button (as depicted) or a touch-sensitive region of the housing 102. The button 110 may control various aspects of the electronic device 100. For example, the button 110 may be used to select icons, items, or other objects displayed on the display 109, to activate or deactivate functions (e.g., to silence an alarm or alert), or the like.

FIGS. 2A-2B show a front and side view, respectively, of a device 200 during one example use condition. The device 200 may be an embodiment of the device 100, and may include the same or similar components and may provide the same or similar functions as the device 100. Accordingly, details of the device 100 described above may apply to the device 200, and for brevity will not be repeated here.

In the example shown in FIGS. 2A-2B, the wearable device 200 includes a crown 212 that a user may contact to provide input through the crown 212. The crown 212 may define an imaging surface 216 that is positioned in a location where a user is likely to touch the crown 212 when interacting with and/or providing input to the crown 212. In some cases, the imaging surface 216 may extend around the entire peripheral portion or surface of the crown 212. Thus, the crown 212 and an associated image sensor may detect inputs applied to any part of the periphery of the crown 212. In other cases, the imaging surface 216 may extend along less than the entire periphery of the crown 212.

The imaging surface 216, which may be defined by a light-transmissive portion of the crown 212, may in optical communication with an image-sensing element within the device 200 to facilitate the image sensor capturing and analyzing an image of whatever object is in contact with the imaging surface 216 (e.g., a bare finger, a gloved finger). For example, the crown 212 may include a light-directing feature, such as an angled surface that changes the direction of the light that corresponds to an image of the object so that it is incident on the image-sensing element. In some cases, the crown 212 includes a monolithic light-transmissive member that defines the imaging surface 216, a shaft of the crown 212, as well as a light-directing feature to redirect light down the shaft of the crown and towards the image-sensing element.

FIGS. 2A-2B show a user interacting with the crown 212 to provide an input to the device 200. In the case of a rotationally constrained crown, the crown will not continuously rotate in response to the force applied by the finger 201 moving along the direction indicated by arrow 217 (while the finger is in contact with the crown 212). Rather, the finger 201 will slide along a surface of the crown 212. In the case of a rotationally free crown, the force applied to the crown 212 by the user's finger 201 causes the crown 212 (or a head or other component of the crown 212) to rotate relative to the housing 202. In either case, an image of the user's finger 201 is projected or otherwise incident on the image-sensing element within the device 200, and the image sensor detects the movement of the finger 201 sliding along the imaging surface 216 and causes the device 200 to take an action in response to the rotation. For example, as shown in FIG. 2A, upon detection of the motion of the finger 201, the device 200 may cause a graphical output 207 on a display 209 to move in accordance with the movement of the finger 201. A movement of the finger 201 in the direction indicated by arrow 217 may result in the graphical output 207 moving in the direction indicated by arrow 215. A movement of the finger 201 in the opposite direction may result in the graphical output 207 moving in the opposite direction. Rotating the crown 212 or sliding a finger along a surface of the crown 212 may change other operational properties of the device 200 in addition to or instead of scrolling a graphical output 207. For example, sliding a finger along the surface of the crown 212 may change parameters or settings of the device, control a zoom level of a graphical output, rotate a displayed graphical output, translate a displayed graphical output, change a brightness level of a graphical output, change a time setting, scroll a list of displayed items (e.g., numbers, letters, words, images, icons, or other graphical output), or the like.

In some cases, the graphical output 207 may also be responsive to inputs applied to a touch-sensitive display 208. The touch-sensitive display 208 may include or be associated with one or more touch and/or force sensors that extend along an output region of a display and which may use any suitable sensing elements and/or sensing techniques to detect touch and/or force inputs applied to the touch-sensitive display 208. The same or similar graphical output 207 manipulations that are produced in response to inputs applied to the crown 212 may also be produced in response to inputs applied to the touch-sensitive display 208. For example, a swipe gesture applied to the touch-sensitive display 208 may cause the graphical output 207 to move along the direction indicated by the arrow 215 (FIG. 2A). As another example, a tap gesture applied to the touch-sensitive display 208 may cause an affordance to be selected or activated. In this way, a user may have multiple different ways to interact with and control an electronic watch, and in particular the graphical output 207 of an electronic watch. Further, while the crown 212 may provide overlapping functionality with the touch-sensitive display 208, using the crown allows for the graphical output of the display to be visible (without being blocked by the finger that is providing the touch input).

Figure 3:
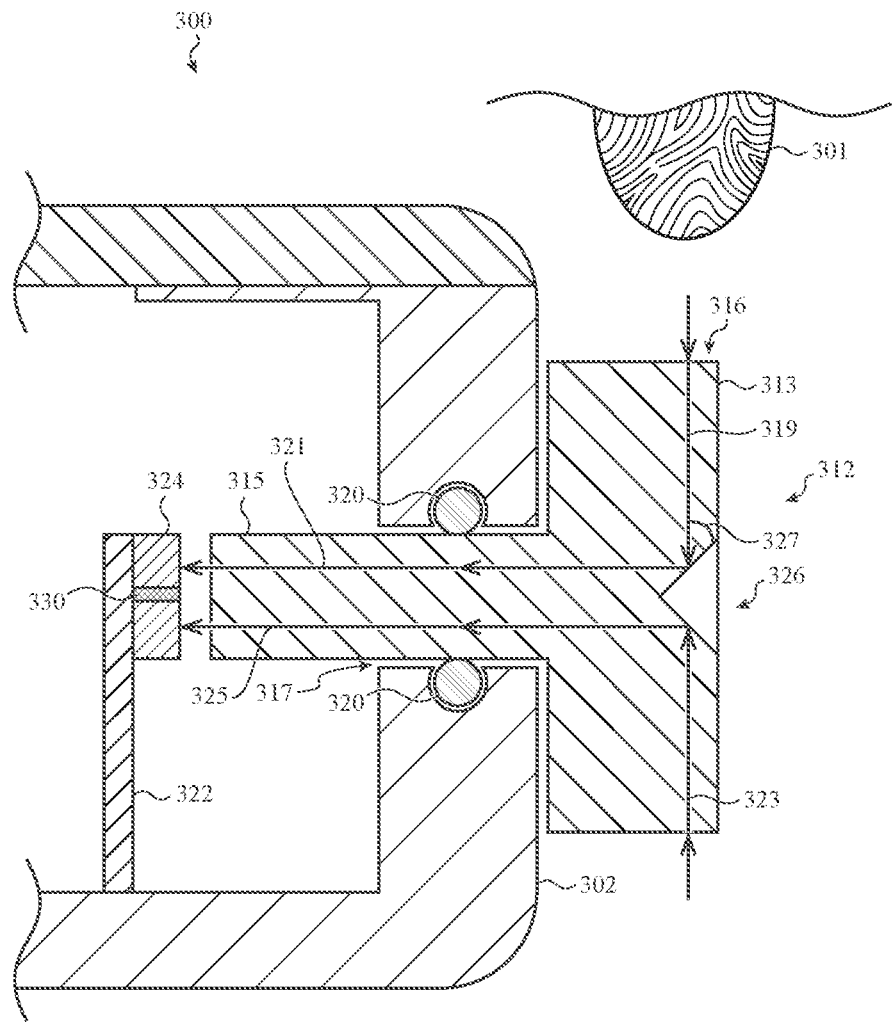
FIG. 3 is a partial cross-sectional view of an example wearable electronic device having a crown with a light-directing feature.

FIG. 3 is a partial cross section of an electronic device 400, corresponding to a view along line A-A in FIG. 1B. The device 300 may be an embodiment of the device 100, and may include the same or similar components and may provide the same or similar functions as the device 100 (or any other wearable device described herein). Accordingly, details of the wearable device 100 described above may apply to the device 300, and for brevity will not be repeated here.

The device 300 includes a crown 312 positioned along a side of a housing 302. The crown 312 may include a head portion or head 313 and a shaft portion or shaft 315. The head 313 and the shaft 315 may be a single monolithic component, as shown, or they may be separate components joined together (e.g., via adhesive, a threaded interface, fasteners, clips, rivets, fusion bonding, or the like). Where the head 313 and shaft 315 are separate components, index matching fluid or material may be used to occupy voids or gaps between the head 313 and shaft 315 (or between any other components of a crown 312).

The head 313 and the shaft 315 may be formed of or include a light-transmissive material, which may define an imaging surface 316. For example, head 313 and/or the shaft 315 may be formed from a light-transmissive solid such as an acrylic, glass, transparent ceramic, sapphire, polycarbonate, quartz, or another suitable material. The solid light-transmissive material may be optically transparent (e.g., clear and uncolored), or it may be transparent some wavelengths of light and opaque (or substantially opaque) to others. For example, if the device uses infrared imaging to capture an image of the user's finger, the light-transmissive areas may be transparent to infrared wavelengths while being opaque to visible light. In some cases, the light-transmissive material of the crown 312 may be coated or otherwise treated so that it is visually opaque. For example, a semi-transparent mirror coating may be applied to an otherwise transparent or light-transmissive material. This may allow the crown 312 to appear, to the wearer, to be opaque and/or metallic, while still allowing light reflected by the portion of the user's finger 301 that is in contact with the crown 312 to enter the crown 312 through the imaging surface 316. As another example, a visibly opaque but infrared-transparent paint, film, ink, or other coating or material may be applied to the crown 312 (and in particular the imaging surface 316) to provide a visually opaque appearance while still facilitating optical imaging of the user's finger 301. As used herein, light-transmissive may be used to refer to something that is transparent or otherwise allows light and/or images to propagate therethrough. In some cases, transparent or light-transmissive materials or components may introduce some diffusion, lensing effects, filtering effects (e.g., color filtering), distortions, attenuation, or the like (e.g., due to surface textures) while still allowing objects or images to be seen or transmitted through the materials or components, and such deviations are understood to be within the scope of the meaning of transparent or light-transmissive. Moreover, components such as a crown, shaft, or head that are formed of or include light-transmissive materials and that function as described herein may be referred to as, for example, a light-transmissive crown, a light-transmissive shaft, and a light-transmissive head.

The device 300 also includes an image-sensing element 324 within the housing 302 and positioned adjacent an end of the shaft 315. An image of the user's finger 301 may be directed onto the image-sensing element 324 so that the image can be captured and analyzed to determine input parameters of an input gesture applied to the crown 312. The image-sensing element 324 may be positioned on a support 322 as shown in FIG. 3, though other mounting and/or support structures are also contemplated.

The image-sensing element 324 is one example of an optical sensing element that may be used. In particular, the image-sensing element 324 may be an optical sensing element with multiple pixels or other sensing regions that capture individual portions of an image, and allow the image sensor (or other optical sensor) to detect and/or store photographs, videos, and the like. In other cases, however, one or more other optical sensing elements may be used, such as photodiodes, single-pixel sensors, photovoltaic cells, or the like. In such cases, the optical sensing element(s) may detect changes in light caused by the presence and/or motion of an object relative to the imaging surface 316 of the crown 312, and may cause the device 300 to take actions based on the detected inputs (including but not limited to controlling any user interface animations or other device functions described herein).

As noted above, the imaging surface 316 is not directly in line with the image-sensing element 324. Accordingly, the crown 312 may include a light-directing feature 326 that directs light corresponding to the image of the user's finger from the imaging surface onto the image-sensing element 324. As shown in FIG. 3, the light-directing feature 326 includes an angled surface of the light-transmissive material of the crown 312. The angled surface defines an interface between materials having different optical indices (e.g., the light-transmissive material and a different material, such as air). When the light corresponding to an image of the user's finger 301 is incident on the interface defined by the angled surface (as represented by arrow 319), all or part of the light may be reflected at an angle (e.g., a 90 degree angle) towards the image-sensing element 324. For example, the angled surface may direct the light (e.g., by causing the light to be reflected) through the shaft 315 of the crown, which may also be light-transmissive. Thus, the shaft 315 guides the reflected light towards the image-sensing element 324 (as indicated by arrow 321). In cases where the light-directing feature 326 reflects light towards the image-sensing element 324, it may be referred to as a reflective feature.

The particular angle of the angled surface may be selected based on various factors, such as the optical properties of the light-transmissive material, the position of the image-sensing element 324 relative to the imaging surface 316, the degree of reflectance desired, and the like. In some cases, the angle of the angled surface has an angle configured to produce total internal reflection of the light. For example, the angled surface may be configured so that the angle of incidence 327 of the light from the object on the imaging surface 316 is equal to or greater than the critical angle for the crown/air interface defined by the angled surface. This configuration may produce total internal reflection of the incident light. More particularly, all of the light reflected by the user's finger 301 towards the light-directing feature 326 may be reflected by the crown/air interface defined by the angled surface.

The angle and/or shape of the light-directing feature 326 that results in total internal reflection may depend, for example, on the geometry and material(s) of the crown 312, the relative angles of the imaging surface 316 and the axis of the shaft 315, and the material that is in contact with the angled surface (air, as shown in FIG. 3). In the case where the crown 312, or the optically operative portions of the crown 312, is acrylic, the critical angle may be about 41 degrees. Accordingly, the light-directing feature 326 may be configured so that the angle of incidence 327 is equal to or greater than about 41 degrees (e.g., about 41 degrees, about 45 degrees, about 50 degrees). In some cases, the angle of incidence on the light-directing feature 326 may be less than the critical angle, in which case some of the light that forms the image may be transmitted through the angled surface, rather than being reflected along the shaft 315. This may be acceptable, as it may not be necessary to achieve total internal reflection. In particular, the light that is reflected by the light-directing feature 326 and incident on the image-sensing element 324 (even though it is less than all of the light being reflected by the user's finger) may be sufficient to allow the image sensor to analyze the image and ultimately detect the input.

In some cases, the exterior surface of the light-directing feature 326 includes a coating, film, or other material or treatment that increases the reflectivity of the imaging directing feature. For example, a mirror coating (or other reflective material) may be applied to the exterior surface of the light-directing feature 326. In such cases, it may not be necessary for the angle of incidence to be at or greater than a critical angle, as the mirror coating may ensure that all or substantially all of the light forming the image is reflected along the shaft or otherwise towards an image-sensing element.

As described herein, the imaging surface 316 of the crown 312 may extend around the entire periphery of the head 313. In such cases, the light-directing feature 326 may have a generally circular configuration so that the light-directing feature 326 directs the light corresponding to the image of the user's finger (or other object or implement) towards the image-sensing element 324 no matter where the finger contacts the periphery of the head 313. For example, the light-directing feature 326 may resemble a conical recess in the end of the head 313. Arrows 323 and 325 in FIG. 3 show an example light path for an object in contact with a bottom portion of the head 313. Due to the radial symmetry of the head 313 and the light-directing feature 326, these arrows may be generally representative of a light path for an object in contact with any portion of the peripheral surface of the head 313. In cases where the imaging surface 316 does not extend around the entire periphery of the head 313, the light-directing feature 326 need not be circular, though it may still have the circular configuration.

Where the imaging surface 316 extends around the entire periphery of the head 313, an image of a user's wrist (which may be proximate to the bottom portion of the peripheral surface of the head 313) may be directed onto the image-sensing element 324 when the device is being worn. To avoid the image of the user's wrist causing false inputs to the device, the image sensor may ignore images received via the bottom surface of the head 313 under certain conditions. For example, if the only received or detected image is received via the bottom surface of the head 313, the device 300 may ignore the image, as users are unlikely to turn the crown 312 by touching only the bottom surface (e.g., in the small area between the crown and the wearer's wrist). As another example, skin patterns or characteristics may differ between a wrist and a finger, and the device 300 may ignore any image that does not contain characteristics of the skin of a finger.

In order to illuminate the finger 301 while it is in contact with the imaging surface 316, the device 300 may include a light source 330 within the housing 302. The light source 330 may direct light through the shaft 315 towards the light-directing feature 326, which in turn directs the light towards the imaging surface 316, thereby illuminating the user's finger and allowing the image-sensing element 324 to capture an image of the user's finger 301. The light source 330 may be configured to emit light of any suitable wavelength(s), based on the particular type of light and/or electromagnetic radiation that the image-sensing element 324 is configured to detect. For example, the light source 330 may emit infrared radiation. The light source 330 (or any other suitable light source) may be integrated with any of the crowns or devices described herein.

In some cases, the device 300 uses dark field illumination components and techniques for illuminating and imaging an object that is in contact with the imaging surface 316. Such components may be integrated with the crown 312 or otherwise positioned within the crown 312 or the housing 302 as appropriate to provide suitable illumination and optical detection via the crown 312.

As noted above, the crown 312 may be rotationally constrained or rotationally free, and may also be axially fixed, or it may be translatable along its axis to accept axial inputs. The crown 312 may also be coupled to or otherwise integrated with the housing 302 in any suitable way. For example, the shaft 315 may extend into the housing 302 through an opening 317. A sealing member 320, such as an elastomeric member or other material or component(s), may form a seal between the shaft 315 and the housing 302 to prevent ingress of liquids, debris, or other contaminants. The sealing member 320 may seal the opening 317 while also allowing the crown 312 to move relative to the housing 302, if the crown 312 is configured to rotate and/or translate. In cases where the shaft 315 is rotationally constrained (e.g., rotationally fixed or partially rotatable), it may still be able to translate axially. As such, the sealing member 320 may seal the opening while allowing the shaft 315 to move axially within the opening 317. In other cases, the shaft 315 may be fixed to the housing 302, such as with adhesive, welds, fusion bonds, or the like. In such cases the sealing member 320 may be omitted.

As described with respect to FIG. 3, the crown 312 may be configured to redirect the light corresponding to an image of a user's finger from an imaging surface onto an image-sensing element that is offset or otherwise not in line with the imaging surface. FIGS. 4A-4D illustrate how the image of the wearer's finger may appear on an image-sensing element and how motion of the user's finger along an imaging surface may be detected by an image sensor.

Figure 4A:
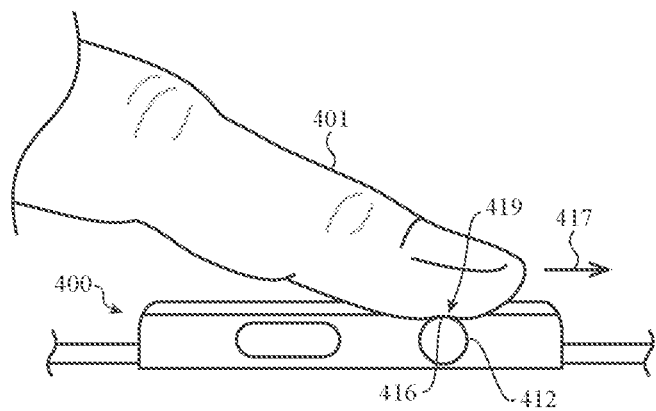
FIG. 4A depicts an example wearable electronic device in a state of use.
Figure 4B:
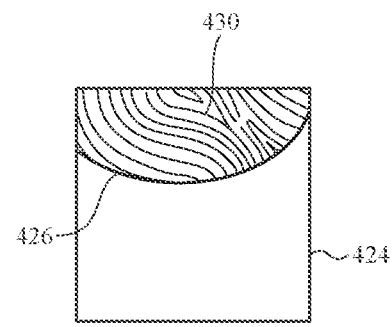
FIG. 4B depicts an example image-sensing element corresponding to the state of use in FIG. 4A.

FIG. 4A shows an example electronic device 400 receiving an input from a finger 401. The device 400 may be an embodiment of the device 100, and may include the same or similar components and may provide the same or similar functions as the device 100 (or any other wearable device described herein). Accordingly, details of the wearable device 100 described above may apply to the device 400, and for brevity will not be repeated here. The device 400 may include a crown 412 (which may be an embodiment of the crown 312 or any other crown described herein). As shown in FIG. 4A, which is a side view of the device 400, a portion 419 of the finger 401 is in contact with an imaging surface 416 of the crown 412. FIG. 4B shows an example image-sensing element 424 (which may be an embodiment of the image-sensing element 324, FIG. 3) with an image 426 of the portion 419 of the finger 401. The image 426 (or light that corresponds to the image) may be directed onto the image-sensing element 424 by the crown 412 along a path as indicated by the arrows 319, 321 in FIG. 3. As shown in FIGS. 4B and 4D (and elsewhere in the figures), the image-sensing element 424 is a square, though any other suitable shape may be used, including circular, rectangular, oval, or the like.

In the configuration shown in FIGS. 4A-4D, the crown 412 may have an imaging surface that extends around the entire periphery of the crown 412. Accordingly, the image 426 is shown positioned along a top portion of the image-sensing element 424, resulting from the fact that the user's finger 401 is in contact with a top-facing surface of the crown 412. Were the user's finger 401 to be in contact with a bottom surface of the crown 412, for example, the image may be incident on a bottom portion of the image-sensing element 424.

Figure 4C:
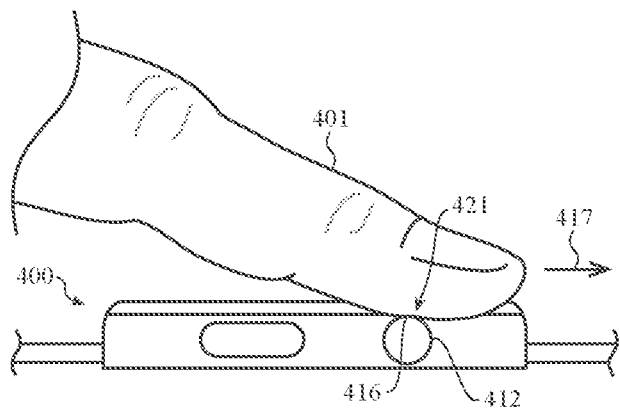
FIG. 4C depicts an example wearable electronic device in another state of use.
Figure 4D:
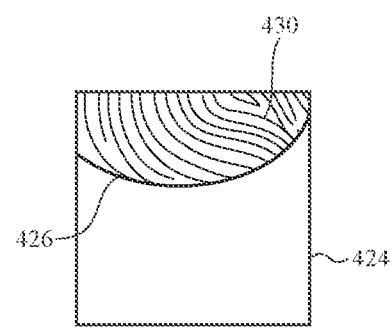
FIG. 4D depicts an example image-sensing element corresponding to the state of use in FIG. 4C.

FIGS. 4C and 4D show the electronic device 400 and image-sensing element 424, respectively, after the finger 401 has moved forward (e.g., in the direction of arrow 417). Notably, the portion 421 of the user's finger 401 that is in contact with the imaging surface 416 has changed, though the area of the image-sensing element 424 that receives the image 426 has not changed. However, because the user's finger 401 has moved, the features of the user's finger that are visible to the image-sensing element 424 (e.g., the ridges or other features of the skin of the finger 401) have moved. For example, feature 430, which may correspond to a ridge of a fingerprint, a texture of a fabric material of a glove, or the like, has moved along the image-sensing element 424. A processor or other component of an image sensor may analyze the image 426 and use features such as the feature 430 to determine a speed and/or direction of motion of the user's finger, and the device 400 may use that information to change or control an operation of the device 400 (e.g., to move or scroll a graphical output on a display).

While FIGS. 4A-4D show a bare finger and a fingerprint, any other object or implement may be used in place of a bare finger. For example, if a gloved finger is used to provide a gesture input to the crown 412, the image sensor may use a feature of the material of the glove to determine a speed and/or direction of motion. Indeed, the image sensor may determine motion of any suitable object by analyzing a texture, surface irregularity, or some other optically detectable feature of the object.

A crown, and more particularly, a head of a crown, may also be shaped or configured to act as a lens to aid in the image sensing functionality of a device. FIGS. 5A-5D illustrate how a lensing feature on a crown may enable a device to reject or otherwise ignore images that do not correspond to a finger in contact with the crown. For example, a lensing feature may be configured so that only objects in direct contact with the crown are in sharp focus.

Figure 5A:
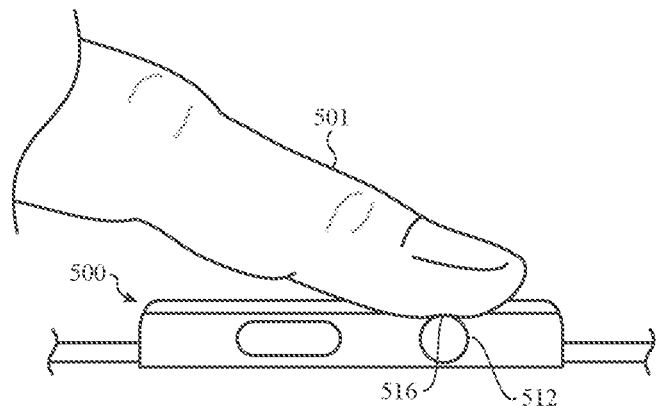
FIG. 5A depicts an example wearable electronic device in a state of use.
Figure 5B:
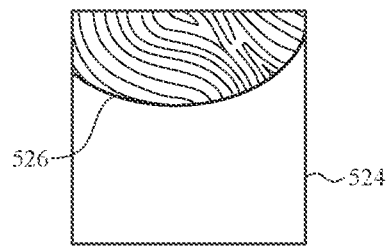
FIG. 5B depicts an example image-sensing element corresponding to the state of use in FIG. 5A.

FIG. 5A, shows an example electronic device 500 receiving an input from a finger 501. The device 500 may be an embodiment of the device 100, and may include the same or similar components and may provide the same or similar functions as the device 100 (or any other wearable device described herein). Accordingly, details of the wearable device 100 described above may apply to the device 500, and for brevity will not be repeated here. The device 500 may include a crown 512 (which may be an embodiment of the crown 312 or any other crown described herein). As shown in FIG. 5A, which is a side view of the device 500, a portion of the finger 501 is in contact with an imaging surface 516 of the crown 512. FIG. 5B shows an example image-sensing element 524 (which may be an embodiment of the image-sensing element 324, FIG. 3) with an image 526 of the finger 501. Under these conditions, the image 526 is in focus so that the features of the user's finger 501 are clearly defined and the image sensor can easily analyze the motion (if any) of the finger 501.

Figure 5C:
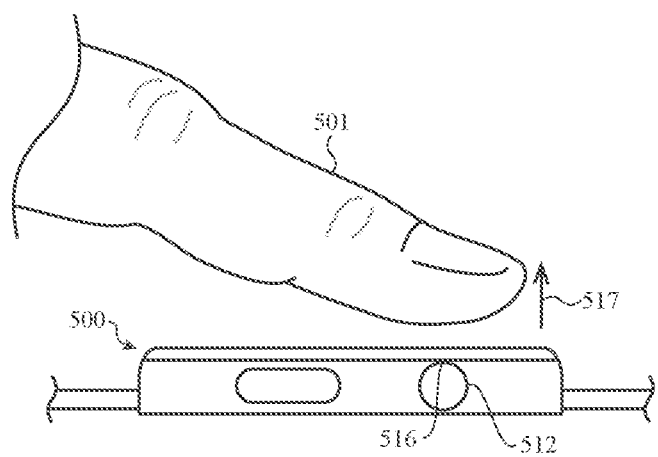
FIG. 5C depicts an example wearable electronic device in another state of use.
Figure 5D:
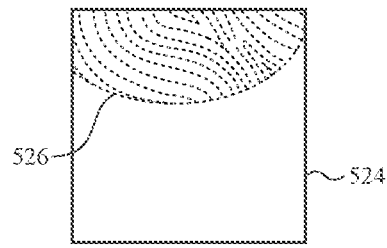
FIG. 5D depicts an example image-sensing element corresponding to the state of use in FIG. 5C.

FIG. 5C shows the electronic device 500 with the finger 501 elevated a distance off of the imaging surface 516 (e.g., moved in a direction indicated by the arrow 517). The crown 512 may have a shape or feature that acts as a lens so that objects that are not in direct contact with (or within a threshold distance of) the crown 512 are out of focus. The threshold distance may be about 0.1 mm, 0.5 mm, 1.0 mm, 2.0 mm, or any other suitable distance. FIG. 5D shows a representation of an out-of-focus image 526. The image sensor may be able to ignore the motion of images that are not in focus, thereby preventing images from the surrounding environment from triggering inputs to the device. In some cases, instead of or in addition to a lensing feature, the device 500 may use a contact sensor to determine when an object is in contact with the crown 512, and ignore image motion when there is nothing contacting the crown 512.

Figure 6A:
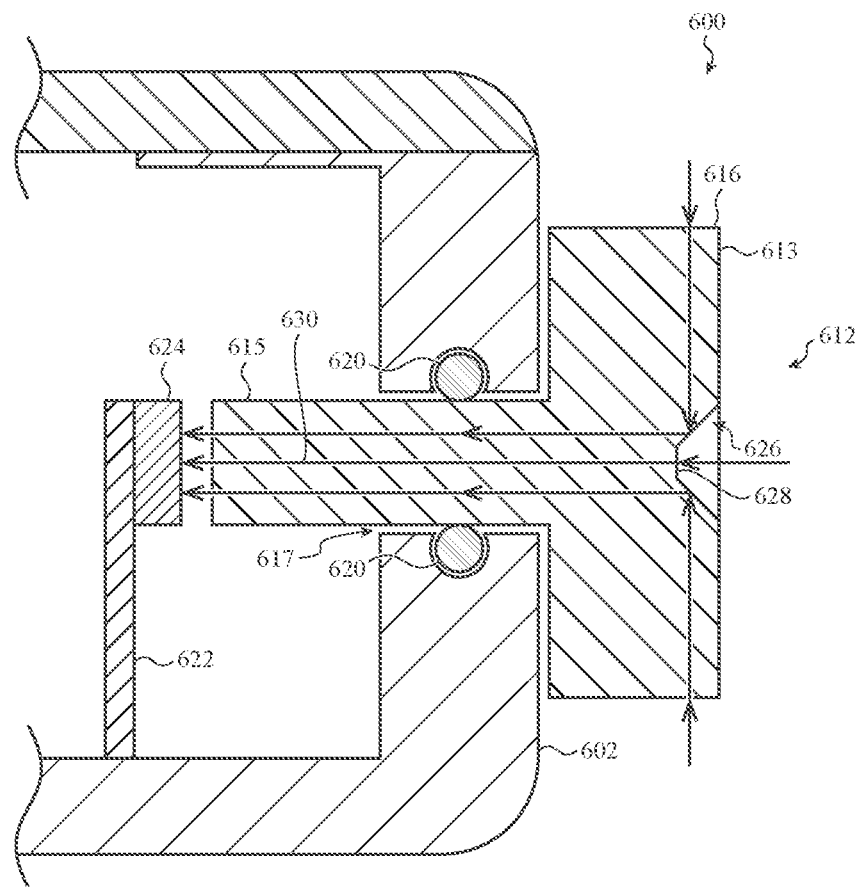
FIG. 6A is a partial cross-sectional view of an example wearable electronic device having a crown with a light-directing feature.

As noted above, in some cases an optical crown as described herein may be configured to detect axial inputs, such as a tap or press on an end surface of the crown. FIG. 6A illustrates an example electronic device 600 with an optical crown that incorporates both optical gesture sensing (as described above), as well as axial touch sensing.

The device 600 may be an embodiment of the device 100, and may include the same or similar components and may provide the same or similar functions as the device 100 (or any other wearable device described herein). Accordingly, details of the wearable device 100 described above may apply to the device 600, and for brevity will not be repeated here. The device 600 may include a crown 612 (which may be an embodiment of the crown 312 or any other crown described herein). The crown 612 may include a head 613 and a shaft 615. The crown 612 may include a light-directing feature 626, which operates substantially the same as the light-directing feature 626, and directs an image from an imaging surface 616 towards an image-sensing element 624. The device may include a sealing member 620 between the shaft 615 and a housing 602, and the image-sensing element 624 may be positioned on a support 622.

The crown 612 also includes an axial imaging surface 628. The axial imaging surface 628 may be configured to allow light corresponding to an image of an object in contact with an end surface of the crown 612 to pass through the shaft 615 and onto the image-sensing element 624. The image sensor may be configured to determine, based on the image received on the image-sensing element 624, whether a user's finger (or other object) is in contact with the end surface of the head 613. In some cases, the axial imaging surface 628 may have a curvature or lensing feature that operates similar to that described with respect to FIGS. 5A-5D, so that only a finger or object that is actually in contact with the end surface of the head 613 cause the image sensor to positively identify an axial touch input.

Figure 6B:
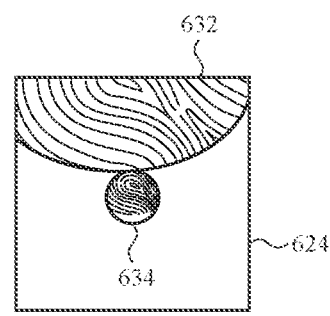
FIG. 6B depicts an example image-sensing element of the wearable electronic device of FIG. 6A.

FIG. 6B shows a representation of the image-sensing element 624, showing example images 632, 634 corresponding to a gesture applied to a peripheral surface of the crown (image 632), and an axial touch input (image 634). As shown, the image 634 is positioned on a center of the image-sensing element 624. Accordingly, the image sensor may be configured to analyze the center of the image-sensing element 624 to determine when an axial touch input has been applied (e.g., by detecting an in-focus image of a user's finger), and to analyze the peripheral portion of the image-sensing element 624 to detect a gesture input applied to the peripheral surface of the crown 612. The device 600 may take any suitable action in response to detecting an axial touch input, such as turning on or off the device (or a display of the device), selecting a user interface element being displayed on the display, activating or deactivating a device function, or the like.

Figure 7:
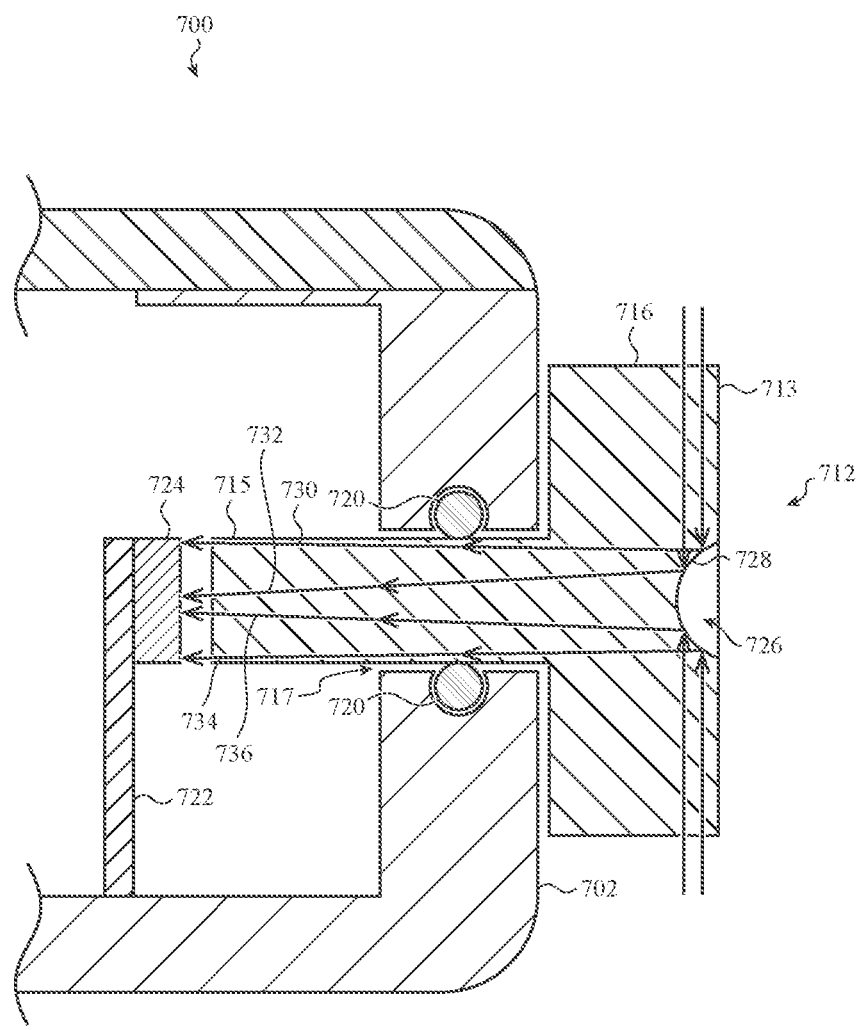
FIG. 7 is a partial cross-sectional view of an example wearable electronic device having a crown with a curved light-directing feature.

In some cases, a light-directing feature may define a curved surface that not only directs light from an imaging surface onto an image-sensing element, but also adjusts, focuses, or otherwise modifies the image. FIG. 7 illustrates an example electronic device 700 with an optical crown having a light-directing feature with a curved surface to both redirect the light and modify the image of the user's finger.

The device 700 may be an embodiment of the device 100, and may include the same or similar components and may provide the same or similar functions as the device 100 (or any other wearable device described herein). Accordingly, details of the wearable device 100 described above may apply to the device 700, and for brevity will not be repeated here. The device 700 may include a crown 712 (which may be an embodiment of the crown 312 or any other crown described herein). The crown 712 may include a head 713 and a shaft 715. The crown 712 may include a light-directing feature 726 that directs light from an imaging surface 716 (e.g., reflected by a user's finger) to an image-sensing element 724, as described above. The device 700 may include a sealing member 720 between the shaft 715 and a housing 702, and the image-sensing element 724 may be positioned on a support 722.

The light-directing feature 726 includes a curved surface 728. The curved surface 728 may be configured so that an angle of incidence of the light from an object (e.g., a user's finger) is equal to or greater than a critical angle of the interface defined by the curved surface 728, thus producing total internal reflection of the light. Further, the curved surface 728 may be configured to magnify the image so that the image occupies a greater area of the image-sensing element 724. FIG. 7 illustrates the magnification of the image by showing the rays 730, 732, 734, and 736 diverging through the shaft 715.

As shown, the curved surface 728 is concave (e.g., as viewed from the exterior of the crown 712), though the curved surface 728 may have other configurations and/or shapes, such as convex shapes, aspherical shapes, combination concave and convex shapes (e.g., having concave and convex regions), or the like. In some cases, the surface is not only curved, but has flat regions, stepped regions, or other complex geometries.

The crown 712 shown in FIG. 7 has an imaging surface along the entire periphery of the head 713, and as such the curved surface 728 may be configured so that a magnified image does not extend past a midpoint of the image-sensing element 724. In examples where the imaging surface extends along less than the entire periphery, the image may be magnified to a greater extent. Thus, for example, a finger applied to the top portion of the head 713 may result in an image that occupies the entire image-sensing element 724 (rather than less than half of the image-sensing element, which may occur with a full-periphery imaging surface).

Figure 8:
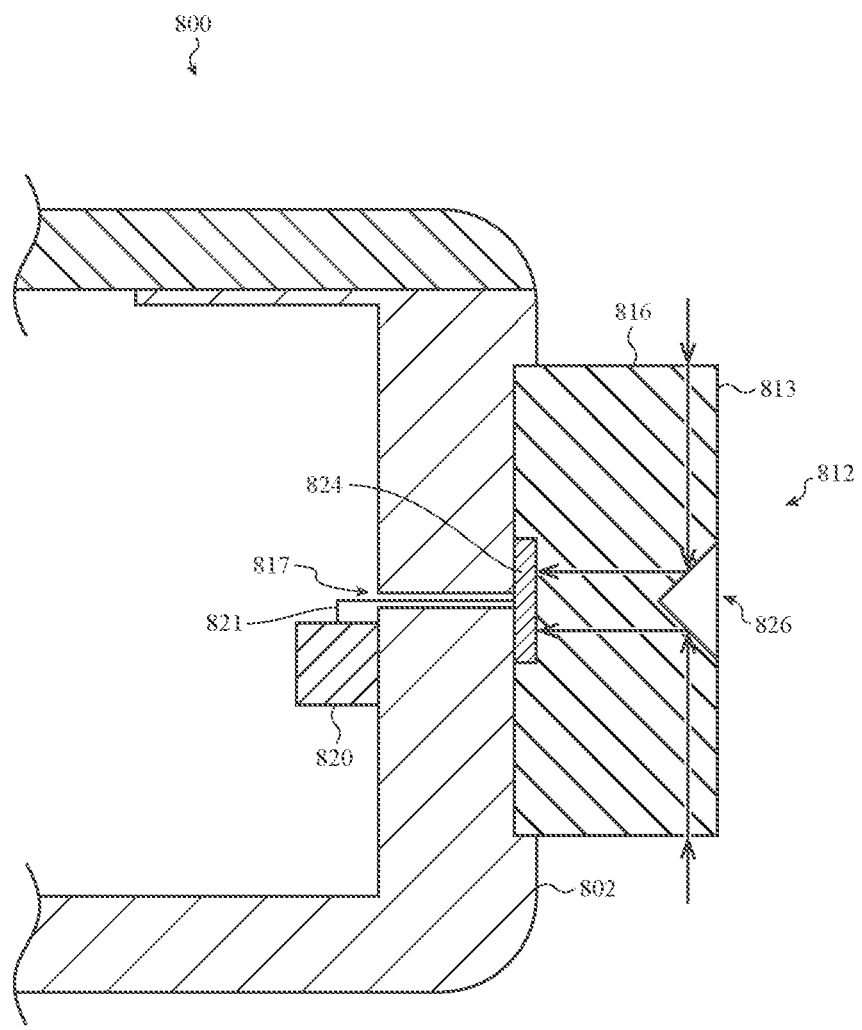
FIG. 8 is a partial cross-sectional view of an example wearable electronic device having a crown that does not include a shaft.

The crowns shown in FIGS. 3-7 each have a shaft extending through an opening in a housing. In some cases, the shaft may be omitted, or the crown may otherwise have a different configuration and/or integration with the housing. FIG. 8 illustrates an example electronic device 800 with an optical crown 812 without a shaft. This configuration may have advantages such as easier or faster manufacturing, better environmental sealing, or the like.

The device 800 may be an embodiment of the device 100, and may include the same or similar components and may provide the same or similar functions as the device 100 (or any other wearable device described herein). Accordingly, details of the wearable device 100 described above may apply to the device 800, and for brevity will not be repeated here. The device 800 may include a crown 812 (which may be an embodiment of the crown 312 or any other crown described herein). The crown 812 may include a head 813. The crown 812 may include a light-directing feature 826 that directs light from an imaging surface 816 to an image-sensing element 824, as described above.

Instead of an internally mounted image-sensing element, the crown 812 includes an image-sensing element 824 mounted on or otherwise incorporated with the head 813. For example, the image-sensing element 824 may be adhered to, encapsulated within, or mechanically fastened to the head 313. In some cases, the image-sensing element 824 may be set into a recess in the head 813. The light-directing feature 826 may still be configured to direct light from the imaging surface 816 onto the image-sensing element 824, though the image will not need to pass through a shaft.

Conductors 821 (e.g., wires, a flex connector, a conductive trace, or another conductive component) may be coupled to the image-sensing element 824 and may extend through an opening 817 in the housing 802, where they connect to a processor 820 or other component of an image sensor that analyzes the images received and/or detected by the image-sensing element 824.

In the device 800, both the head 813 and the image-sensing element 824 are positioned outside of the interior volume of the device housing 802. This may simplify manufacture of the device 800. For example, because there is no shaft, the need for precise optical alignment between the shaft and the image-sensing element may be eliminated. Moreover, the mating of the head 813 to the housing 802, as well as the smaller opening 817 that need only accommodate the conductors 821 (rather than a crown shaft), may allow for better sealing against liquid or other debris.

The head 813 may be attached to the housing 802 using adhesive, welding, mechanical fasteners, or the like. Where the head 813 is configured to rotate and/or translate relative to the housing 802, the head 813 may be attached to the housing 802 with bearings, bushings, guides, or other suitable components.

Figure 9:
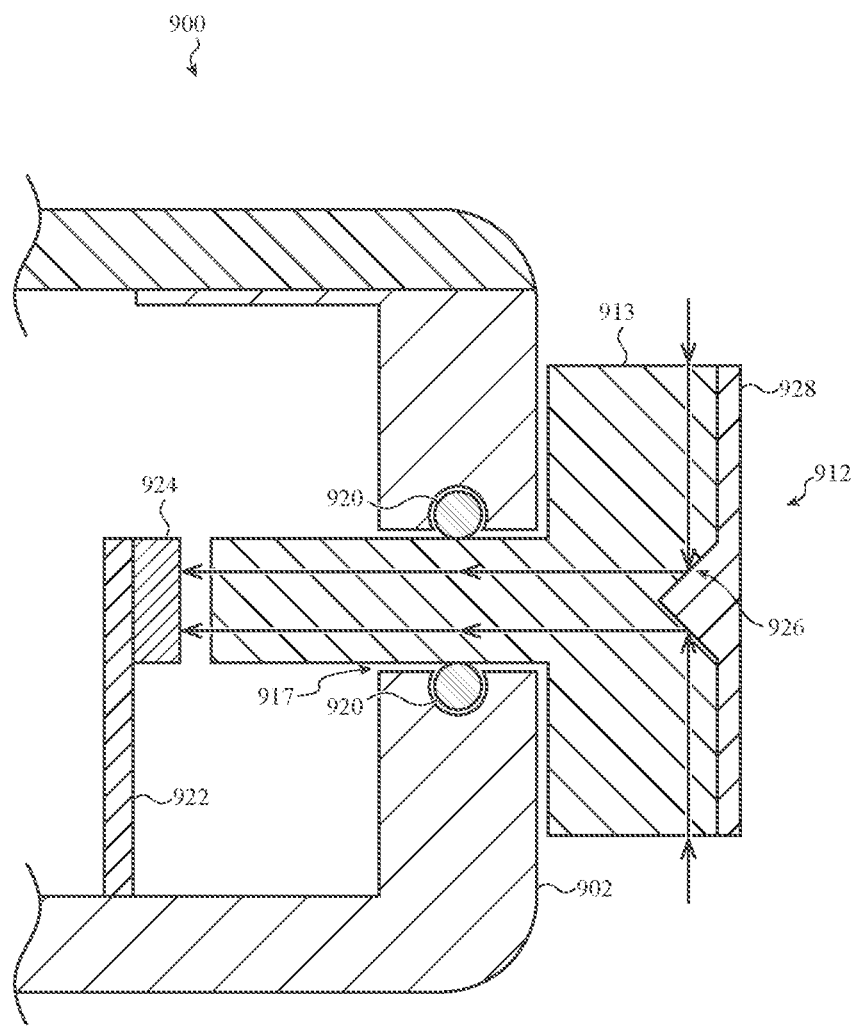
FIG. 9 is a partial cross-sectional view of an example wearable electronic device having a crown with a cover member.

FIG. 9 illustrates an example electronic device 900 with an optical crown 912 with a cover member over an end surface of the crown. The device 900 may be an embodiment of the device 100, and may include the same or similar components and may provide the same or similar functions as the device 100 (or any other wearable device described herein). Accordingly, details of the wearable device 100 described above may apply to the device 900, and for brevity will not be repeated here. The device 900 may include a crown 912 (which may be an embodiment of the crown 312 or any other crown described herein). The crown 912 may include a head 913 and a shaft 915. The crown 912 may include a light-directing feature 926 that directs light from an imaging surface 916 to an image-sensing element 924, as described above. The device 900 may include a sealing member 920 between the shaft 915 and a housing 902, and the image-sensing element 924 may be positioned on a support 922.

In FIG. 9, the crown 912 also includes a cover member 928 attached to the end of the head 913. The cover member 928, which may also resemble and/or be referred to as a cap, may cover and protect the light-directing feature 926, and may provide a cosmetic exterior surface to the crown 912. The cover member 928 may be formed of any suitable material, such as plastic, sapphire, metal, gemstones, ceramic, or the like. In cases where the crown 912 includes an axial touch sensing system, as described above, the cover member 928 or a portion thereof may be light-transmissive to allow the axial touch sensing system to operate. The cover member 928 may be attached to the crown 912 in any suitable manner, including welding, adhesives, mechanical fasteners and/or interlocks, soldering, brazing, or the like. The cover member 928, and more particularly a peripheral surface of the cover member 928, may be substantially flush with the cylindrical peripheral surface of the head 913.

Figure 10:
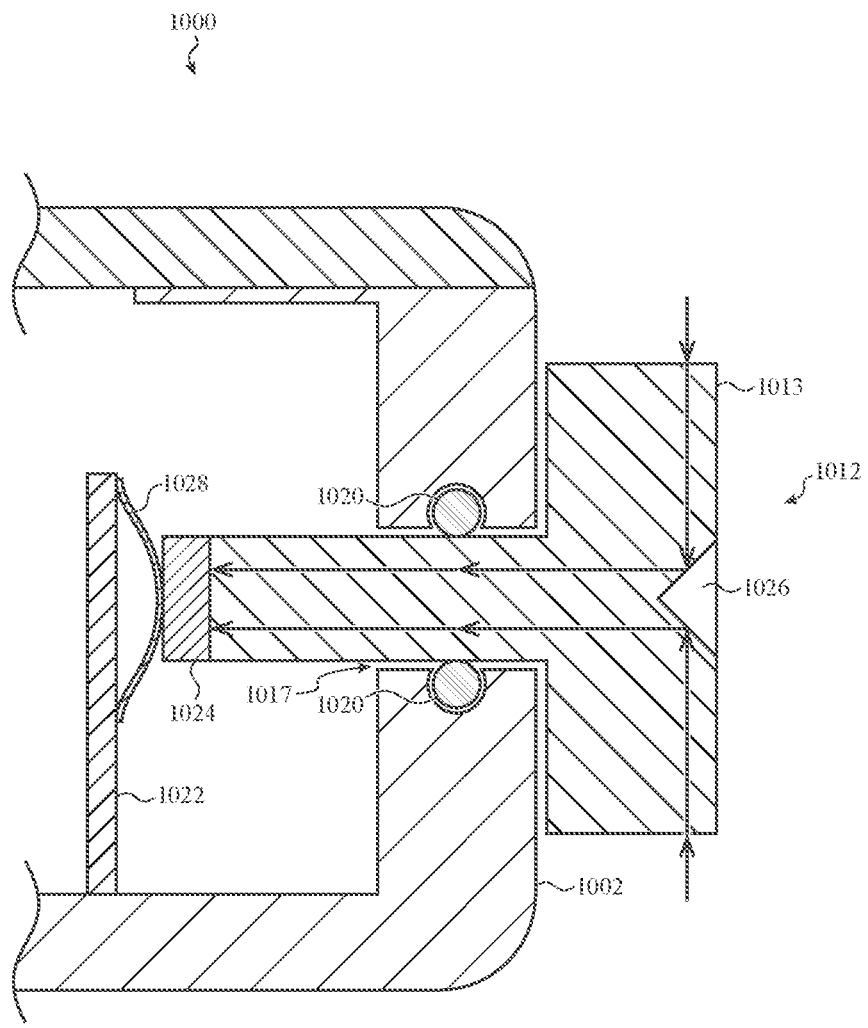
FIG. 10 is a partial cross-sectional view of an example wearable electronic device having a crown with a light-directing feature and a force sensor.

FIG. 10 illustrates an example electronic device 1000 with an optical crown 1012. The device 1000 may be an embodiment of the device 100, and may include the same or similar components and may provide the same or similar functions as the device 100 (or any other wearable device described herein). Accordingly, details of the wearable device 100 described above may apply to the device 1000, and for brevity will not be repeated here. The device 1000 may include a crown 1012 (which may be an embodiment of the crown 312 or any other crown described herein). The crown 1012 may include a head 1013 and a shaft 1015. The crown 1012 may include a light-directing feature 1026 that directs light from an imaging surface 1016 to an image-sensing element 1024, as described above. The device 1000 may include a sealing member 1020 between the shaft 1015 and a housing 1002, and the image-sensing element 1024 may be positioned on a support 1022.

The device 1000 also includes a force sensing component 1028. The force sensing component 1028 may be configured to detect axial and/or translational inputs applied to the crown 1012, as described above. As shown, the force sensing component 1028 is a dome switch, which may provide both an input detection and a tactile output function. For example, when an axial force exceeding a collapse threshold of the dome switch is applied to the crown 1012, the dome switch may abruptly collapse, which both closes an electrical contact (thereby allowing the device to register the input), and produces a tactile "click" or other tactile output that may be felt by the user. In other cases, the force sensing component 1028 may be a force sensor that is configured to produce an electrical response that corresponds to an amount of force (e.g., axial force) applied to the crown 1012. The electrical response may increase continuously as the amount of applied force increases, and as such may provide non-binary force sensing.

Figure 11A:
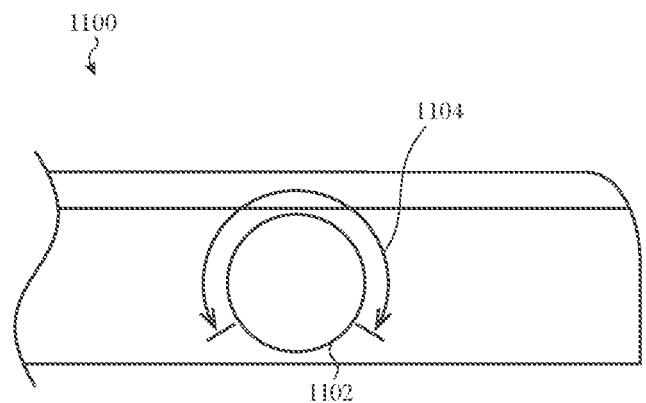
FIGS. 11A-11B are side views of example wearable electronic devices with crowns having imaging surfaces.
Figure 11B:
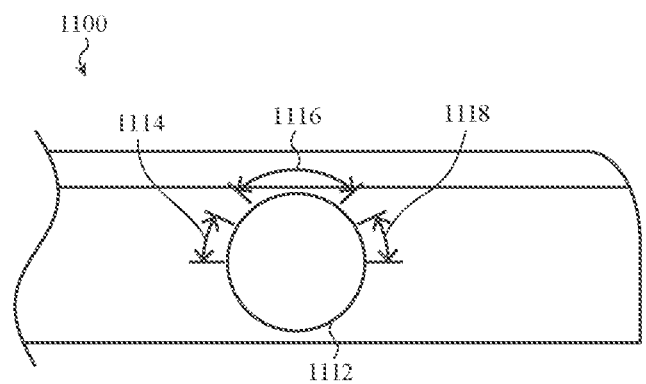

As described above, an imaging surface may be defined along an entire peripheral surface of a crown, or along only a portion of a peripheral surface. FIGS. 11A and 11B illustrate example crowns in which the imaging surface extends along less than the entire peripheral surface. FIG. 11A, for example, shows an example device 1100 (which may be an embodiment of the device 100, and may include the same or similar components and may provide the same or similar functions as the device 100) with a crown 1102. An imaging surface 1104 may extend along less than the entire peripheral surface of the crown 1102. As shown, the portion of the crown 1102 that faces or is nearest a user's wrist when the device is being worn may not be part of the imaging surface 1104. This may help prevent false inputs from being detected due to movement of the device 1100 relative to the user's wrist (e.g., as may occur during jostling or other normal use conditions).

FIG. 11B shows an example device 1110 (which may be an embodiment of the device 100, and may include the same or similar components and may provide the same or similar functions as the device 100) with a crown 1112. The crown 1112 defines several imaging surfaces, which may also be described as an imaging surface having several discrete segments. For example, an imaging surface 1114 may extend along a top portion of the crown 1112, while imaging surfaces 1114 and 1118 extend along side portions of the crown 1112. The crown 1112 may not capture images in the areas between adjacent imaging surfaces.

In FIGS. 11A-11B, the imaging surfaces may be defined by light-transmissive windows set into an otherwise opaque head. For example, windows of glass, plastic, ceramic, sapphire, or other materials may be inset into a head of metal, plastic, or other opaque material.

Figure 12:
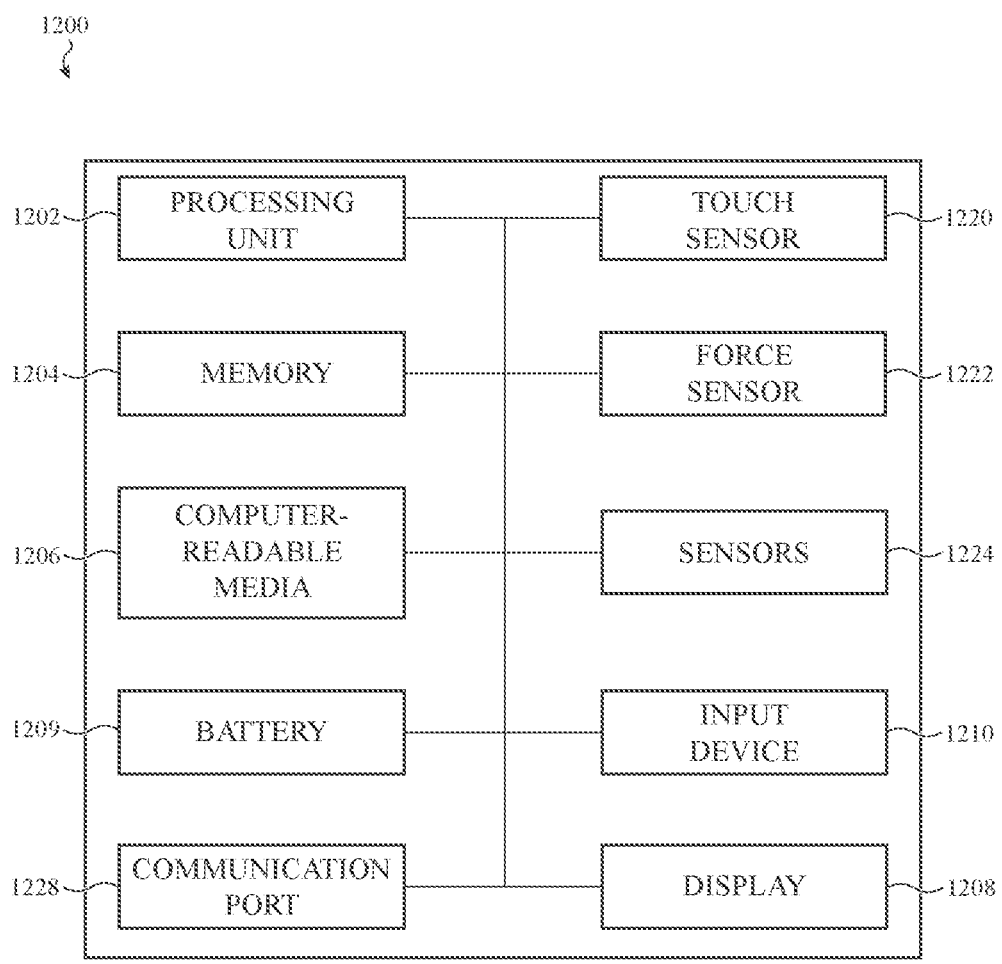
FIG. 12 depicts example components of a wearable electronic device.

FIG. 12 depicts an example schematic diagram of an electronic device 1200. By way of example, the device 1200 of FIG. 12 may correspond to the wearable electronic device 100 shown in FIGS. 1A-1B (or any other wearable electronic device described herein). To the extent that multiple functionalities, operations, and structures are disclosed as being part of, incorporated into, or performed by the device 1200, it should be understood that various embodiments may omit any or all such described functionalities, operations, and structures. Thus, different embodiments of the device 1200 may have some, none, or all of the various capabilities, apparatuses, physical features, modes, and operating parameters discussed herein.

As shown in FIG. 12, a device 1200 includes a processing unit 1202 operatively connected to computer memory 1204 and/or computer-readable media 1206. The processing unit 1202 may be operatively connected to the memory 1204 and computer-readable media 1206 components via an electronic bus or bridge. The processing unit 1202 may include one or more computer processors or microcontrollers that are configured to perform operations in response to computer-readable instructions. The processing unit 1202 may include the central processing unit (CPU) of the device. Additionally or alternatively, the processing unit 1202 may include other processors within the device including application specific integrated chips (ASIC) and other microcontroller devices.

The memory 1204 may include a variety of types of non-transitory computer-readable storage media, including, for example, read access memory (RAM), read-only memory (ROM), erasable programmable memory (e.g., EPROM and EEPROM), or flash memory. The memory 1204 is configured to store computer-readable instructions, sensor values, and other persistent software elements. Computer-readable media 1206 also includes a variety of types of non-transitory computer-readable storage media including, for example, a hard-drive storage device, a solid-state storage device, a portable magnetic storage device, or other similar device. The computer-readable media 1206 may also be configured to store computer-readable instructions, sensor values, and other persistent software elements.

In this example, the processing unit 1202 is operable to read computer-readable instructions stored on the memory 1204 and/or computer-readable media 1206. The computer-readable instructions may adapt the processing unit 1202 to perform the operations or functions described above with respect to FIGS. 1A-11B. In particular, the processing unit 1202, the memory 1204, and/or the computer-readable media 1206 may be configured to cooperate with a sensor 1224 (e.g., an image sensor that detects input gestures applied to an imaging surface of a crown) to control the operation of a device in response to an input applied to a crown of a device (e.g., the crown 112). The computer-readable instructions may be provided as a computer-program product, software application, or the like.

As shown in FIG. 12, the device 1200 also includes a display 1208. The display 1208 may include a liquid-crystal display (LCD), organic light emitting diode (OLED) display, light emitting diode (LED) display, or the like. If the display 1208 is an LCD, the display 1208 may also include a backlight component that can be controlled to provide variable levels of display brightness. If the display 1208 is an OLED or LED type display, the brightness of the display 1208 may be controlled by modifying the electrical signals that are provided to display elements. The display 1208 may correspond to any of the displays shown or described herein.

The device 1200 may also include a battery 1209 that is configured to provide electrical power to the components of the device 1200. The battery 1209 may include one or more power storage cells that are linked together to provide an internal supply of electrical power. The battery 1209 may be operatively coupled to power management circuitry that is configured to provide appropriate voltage and power levels for individual components or groups of components within the device 1200. The battery 1209, via power management circuitry, may be configured to receive power from an external source, such as an AC power outlet. The battery 1209 may store received power so that the device 1200 may operate without connection to an external power source for an extended period of time, which may range from several hours to several days.

In some embodiments, the device 1200 includes one or more input devices 1210. An input device 1210 is a device that is configured to receive user input. The one or more input devices 1210 may include, for example, a push button, a touch-activated button, a keyboard, a key pad, or the like (including any combination of these or other components). In some embodiments, the input device 1210 may provide a dedicated or primary function, including, for example, a power button, volume buttons, home buttons, scroll wheels, and camera buttons. Generally, a touch sensor or a force sensor may also be classified as an input device. However, for purposes of this illustrative example, the touch sensor 1220 and a force sensor 1222 are depicted as distinct components within the device 1200.

The device 1200 may also include a sensor 1224 that detects inputs provided by a user to a crown of the device (e.g., the crown 112). As described above, the sensor 1224 may include sensing circuitry and other sensing elements that facilitate sensing of gesture inputs applied to an imaging surface of a crown, as well as other types of inputs applied to the crown (e.g., rotational inputs, translational or axial inputs, axial touches, or the like). The sensor 1224 may include an optical sensing element, such as a charge-coupled device (CCD), complementary metal-oxide-semiconductor (CMOS), or the like. The sensor 1224 may correspond to any sensors described herein or that may be used to provide the sensing functions described herein.

The device 1200 may also include a touch sensor 1220 that is configured to determine a location of a touch on a touch-sensitive surface of the device 1200 (e.g., an input surface defined by the portion of a cover 108 over a display 109). The touch sensor 1220 may use or include capacitive sensors, resistive sensors, surface acoustic wave sensors, piezoelectric sensors, strain gauges, or the like. In some cases, the touch sensor 1220 associated with a touch-sensitive surface of the device 1200 may include a capacitive array of electrodes or nodes that operate in accordance with a mutual-capacitance or self-capacitance scheme. The touch sensor 1220 may be integrated with one or more layers of a display stack (e.g., the display 109) to provide the touch-sensing functionality of a touchscreen. Moreover, the touch sensor 1220, or a portion thereof, may be used to sense motion of a user's finger as it slides along a surface of a crown, as described herein.

The device 1200 may also include a force sensor 1222 that is configured to receive and/or detect force inputs applied to a user input surface of the device 1200 (e.g., the display 109). The force sensor 1222 may use or include capacitive sensors, resistive sensors, surface acoustic wave sensors, piezoelectric sensors, strain gauges, or the like. In some cases, the force sensor 1222 may include or be coupled to capacitive sensing elements that facilitate the detection of changes in relative positions of the components of the force sensor (e.g., deflections caused by a force input). The force sensor 1222 may be integrated with one or more layers of a display stack (e.g., the display 109) to provide force-sensing functionality of a touchscreen.

The device 1200 may also include a communication port 1228 that is configured to transmit and/or receive signals or electrical communication from an external or separate device. The communication port 1228 may be configured to couple to an external device via a cable, adaptor, or other type of electrical connector. In some embodiments, the communication port 1228 may be used to couple the device 1200 to an accessory, including a dock or case, a stylus or other input device, smart cover, smart stand, keyboard, or other device configured to send and/or receive electrical signals.

As described above, one aspect of the present technology is the gathering and use of data available from various sources to facilitate the detection of inputs to an electronic device. The present disclosure contemplates that in some instances, this gathered data may include personal information data that uniquely identifies or can be used to contact or locate a specific person. Such personal information data can include biometric data (e.g., fingerprints), demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, users can deactivate input detection using imaging techniques that may capture or use biometric information (e.g., fingerprints, skin features, etc.). In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, gesture inputs applied to a crown with an object other than a finger, or with a gloved finger, may be operable to control the operation of an electronic device. Further, the functionality described herein may be provide without requiring any persistent storage of personal information. For example, images of a user's finger that are captured by an image sensor may be analyzed and then discarded immediately after the necessary motion information has been determined.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic watch comprising:
a housing defining a side surface of the electronic watch;
a display positioned at least partially within the housing and configured to display a graphical output;
a transparent cover coupled to the housing and defining a front surface of the electronic watch;
an optical sensing element;
a crown extending from the side surface of the electronic watch and defining a peripheral surface along an exterior portion of the crown, wherein the electronic watch is configured to:
detect, using the optical sensing element, movement of an object along the peripheral surface of the crown; and
modify the graphical output in accordance with the movement of the object along the peripheral surface of the crown.

2. The electronic watch of claim 1, wherein:
the electronic watch further comprises a touch sensor positioned below the transparent cover and configured to detect touch inputs applied to the transparent cover; and
the crown comprises a light-directing feature configured to direct, onto the optical sensing element, an image of an object in contact with the peripheral surface of the crown.

3. The electronic watch of claim 2, wherein the light-directing feature comprises an interface between a first material and a second material, the interface configured to reflect incident light.

4. The electronic watch of claim 1, wherein the optical sensing element is positioned within the housing.

5. The electronic watch of claim 1, wherein the optical sensing element is positioned within the crown.

6. The electronic watch of claim 1, wherein the crown comprises:
an opaque portion; and
a light-transmissive portion defining a portion of the peripheral surface.

7. The electronic watch of claim 6, wherein the optical sensing element receives light through the light-transmissive portion of the crown.

8. A wearable electronic device comprising:
a housing;
a display positioned at least partially within the housing and configured to display a graphical output;
a crown at least partially external to the housing and defining a light-transmissive window; and
an optical sensing element within the housing and configured to receive an image of an object in contact with the light-transmissive window, wherein the wearable electronic device is configured to:
detect, using the optical sensing element, movement of the object along the light-transmissive window; and
modify the graphical output in accordance with the movement of the object along the light-transmissive window.

9. The wearable electronic device of claim 8, wherein the crown comprises a light-directing feature configured to direct, onto the optical sensing element, an image of an object in contact with the light-transmissive window.

10. The wearable electronic device of claim 9, wherein the light-directing feature defines an angled surface configured to direct light from the light-transmissive window to the optical sensing element.

11. The wearable electronic device of claim 10, further comprising a reflective material on the angled surface.

12. The wearable electronic device of claim 8, wherein the crown comprises:
an opaque member; and
a light-transmissive member positioned in the opaque member and defining the light-transmissive window.

13. The wearable electronic device of claim 8, further comprising a light source at least partially within the housing and configured to illuminate the object.

14. The wearable electronic device of claim 8, wherein the light-transmissive window includes a semi-transparent mirror coating.

15. An electronic watch comprising:
a housing;
a display positioned at least partially within the housing;
an optical sensor at least partially within the housing and comprising an optical sensing element; and
a crown comprising:
a head portion defining an optical sensing region along a peripheral surface of the head portion;
a shaft portion extending at least partially into the housing; and
a light-directing feature directing light from the optical sensing region towards the optical sensing element.

16. The electronic watch of claim 15, further comprising a contact sensor configured to detect contact between an object and the crown.

17. The electronic watch of claim 15, wherein the head portion comprises:
a metal portion; and
a light-transmissive window coupled to the metal portion and at least partially defining the optical sensing region.

18. The electronic watch of claim 15, wherein the crown comprises:

a transparent member defining the head portion and the shaft portion; and an opaque coating positioned on the transparent member.

19. The electronic watch of claim 18, wherein the optical sensing region is defined by an opening in the opaque coating.

20. The electronic watch of claim 18, wherein the optical sensor includes an image-sensing element.

* * * * *